United States Patent
Hikosaka et al.

(10) Patent No.: US 11,268,559 B2
(45) Date of Patent: *Mar. 8, 2022

(54) FASTENING STRUCTURE AND FASTENING METHOD

(71) Applicant: NIPPON STEEL NISSHIN CO., LTD., Tokyo (JP)

(72) Inventors: Akiyoshi Hikosaka, Tokyo (JP); Kouki Tomimura, Tokyo (JP)

(73) Assignee: NIPPON STEEL NISSHIN CO., LTD., Tokyo (JP)

(*) Notice: Subject to any disclaimer, the term of this patent is extended or adjusted under 35 U.S.C. 154(b) by 329 days.

This patent is subject to a terminal disclaimer.

(21) Appl. No.: 16/483,029

(22) PCT Filed: Jan. 31, 2018

(86) PCT No.: PCT/JP2018/003185
§ 371 (c)(1),
(2) Date: Aug. 1, 2019

(87) PCT Pub. No.: WO2018/143264
PCT Pub. Date: Aug. 9, 2018

(65) Prior Publication Data
US 2020/0018338 A1  Jan. 16, 2020

(30) Foreign Application Priority Data
Feb. 2, 2017  (JP) .............. JP2017-018005

(51) Int. Cl.
*F16B 19/00* (2006.01)
*F16B 19/05* (2006.01)
*F16B 5/00* (2006.01)

(52) U.S. Cl.
CPC .............. *F16B 19/05* (2013.01); *F16B 5/00* (2013.01)

(58) Field of Classification Search
CPC ...... F16B 19/05; F16B 35/048; F16B 35/041; F16B 39/026; B21J 15/022
See application file for complete search history.

(56) References Cited

U.S. PATENT DOCUMENTS 1,335,613 A * 3/1920 Selle .................. F16B 35/041
411/368
1,396,455 A * 11/1921 Moore ................ F16B 35/048
411/411

(Continued)

FOREIGN PATENT DOCUMENTS

EP 0597158 A1 5/1994
GB 2343642 A * 5/2000 ............. F16B 19/05

(Continued)

OTHER PUBLICATIONS

European Patent Office, Patent Search Report dated Feb. 20, 2020.
(Continued)

*Primary Examiner* — Gary W Estremsky
(74) *Attorney, Agent, or Firm* — Li & Cai Intellectual Property Office

(57) ABSTRACT

A fastening member for fastening two or more components, ensuring a high degree of freedom in terms of fastening positions and objects, reducing the number of holes, preventing the rotation of the components and the fastening member in one-point fastening, and maintaining high strength and resistance against vibration after fastening. Specifically, a fastening structure for fastening the first and second components, which comprises a first component, a pin that has non-helical grooves running in a circumferential direction and aligned along a longitudinal direction and whose one end in the longitudinal direction is bonded to the first component, a second component that has an insertion hole for inserting the pin, and a collar that is fitted around and bonded to the pin so that the second component is (Continued)

positioned between the collar and the first component, wherein said second component is prevented from rotating with respect to said pin.

3 Claims, 25 Drawing Sheets

(56) References Cited

U.S. PATENT DOCUMENTS

| | | | | |
|---|---|---|---|---|
| 1,830,554 | A * | 11/1931 | McMullin | F16B 35/048 |
| | | | | 411/399 |
| 2,395,377 | A * | 2/1946 | Maclean, Jr. | F16B 35/048 |
| | | | | 411/166 |
| 2,531,351 | A * | 11/1950 | Churchill | F16B 33/002 |
| | | | | 24/290 |
| 3,176,808 | A | 4/1965 | Matthews | |
| 3,687,501 | A * | 8/1972 | Wilson | F16B 39/282 |
| | | | | 403/408.1 |
| 4,114,670 | A | 9/1978 | Akashi et al. | |
| 4,472,096 | A * | 9/1984 | Ruhl | F16B 19/05 |
| | | | | 411/361 |
| 5,411,154 | A * | 5/1995 | Vargo | F16B 12/30 |
| | | | | 211/189 |
| 5,421,557 | A * | 6/1995 | Vise | E04H 17/003 |
| | | | | 248/74.5 |
| 5,492,446 | A * | 2/1996 | Hawkins | F01D 17/162 |
| | | | | 411/116 |
| 6,227,782 | B1 * | 5/2001 | Bowling | F16B 35/048 |
| | | | | 411/114 |
| 7,814,735 | B2 * | 10/2010 | Neudorf | F16B 35/041 |
| | | | | 56/1 |
| 9,829,018 | B2 * | 11/2017 | Wilkerson | F16B 33/002 |
| 10,208,618 | B2 * | 2/2019 | Gasmen | F04D 29/563 |
| 2004/0094681 | A1 * | 5/2004 | Birnbaum | F16L 3/243 |
| | | | | 248/300 |
| 2004/0184868 | A1 * | 9/2004 | Jackson | F16B 5/02 |
| | | | | 403/122 |
| 2016/0327080 | A1 * | 11/2016 | Razzaboni | E02F 9/2883 |
| 2020/0018339 | A1 * | 1/2020 | Hikosaka | F16B 5/04 |
| 2020/0166066 | A1 * | 5/2020 | Brennetot | F16B 19/05 |

FOREIGN PATENT DOCUMENTS

| | | |
|---|---|---|
| GB | 2343642 A | 5/2000 |
| JP | S49-61546 A | 6/1974 |
| JP | 5020070 U | 3/1975 |
| JP | S57-73214 A | 5/1982 |
| JP | 61269986 A | 11/1986 |
| JP | H06-294419 A | 10/1994 |
| JP | 2005-315363 A | 11/2005 |
| JP | 4686130 B2 | 5/2011 |
| KR | 1020030073786 A | 9/2003 |

OTHER PUBLICATIONS

Alcoa Fastening Systems, "The Unshakeable World of Huck Fastening Systems" <U R L : http://www.asia.afshuck.net/jp/Fasteners.html> <U R L : http://www.asia.afshuck.net/en/Fasteners.html>.
China Patent Office, Office action dated Apr. 3, 2020.
China Patent Office, Office action dated Jul. 17, 2020.

* cited by examiner

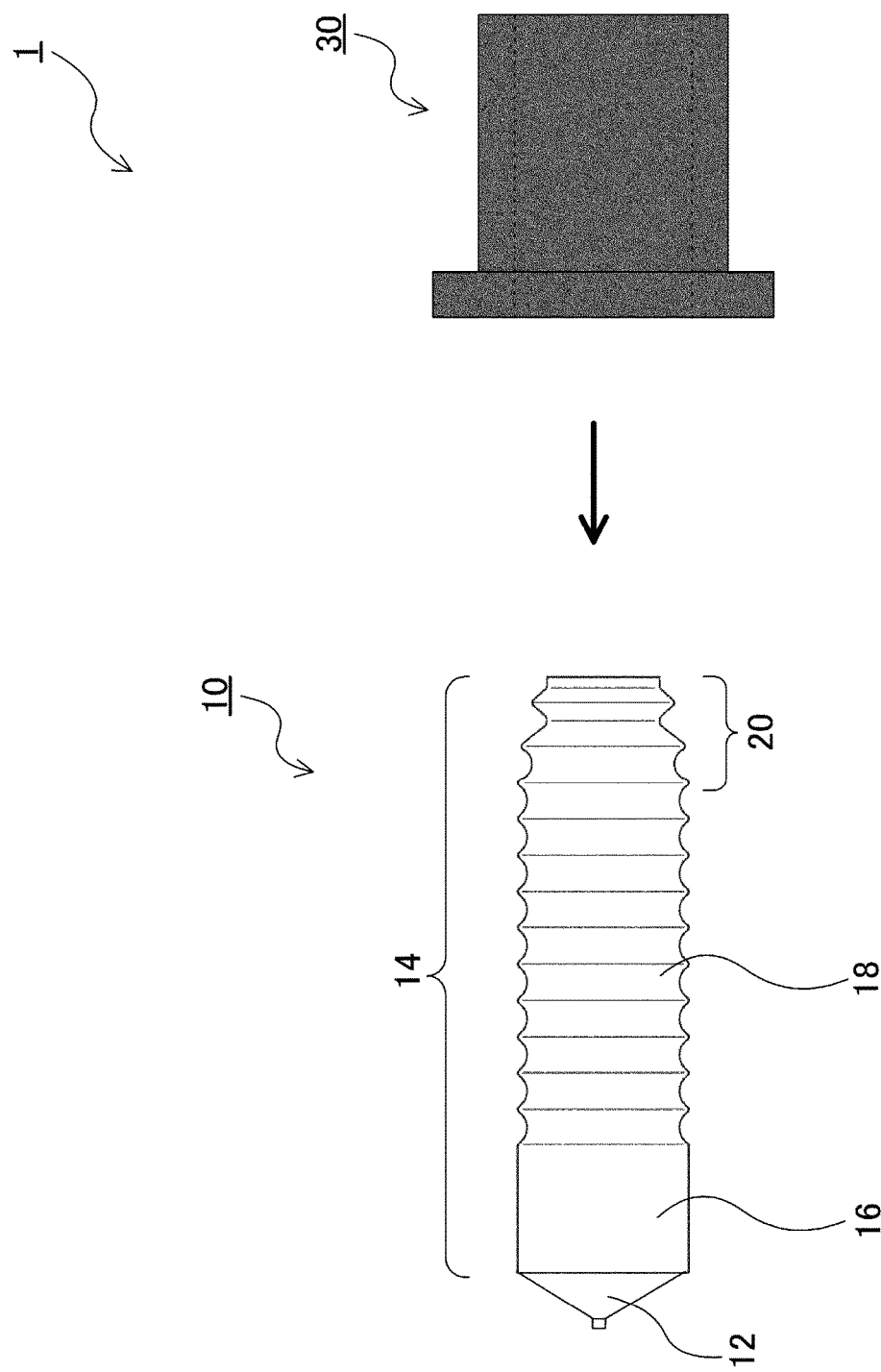

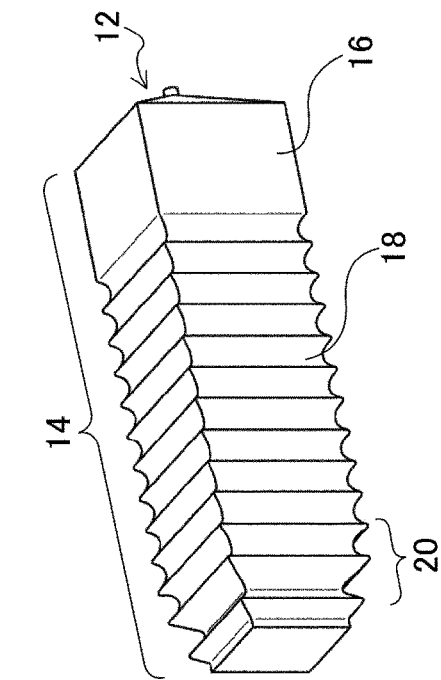
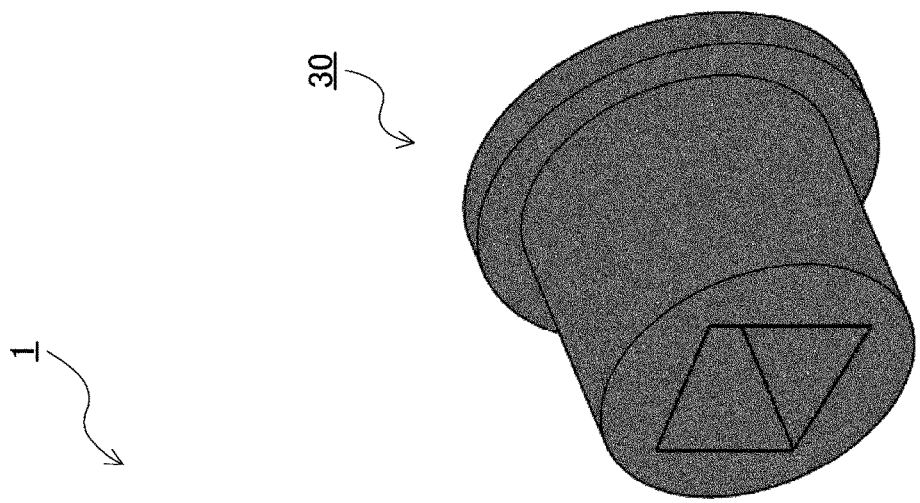
FIG. 2B
FIG. 2A

FASTENING STRUCTURE AND FASTENING METHOD

BACKGROUND OF THE INVENTION

1. Field of the Invention

The present invention relates to a structure and a method for fastening first and second components.

2. Description of Related Art

Some devices, such as drum type washing machines, solar power generators, and natural refrigerant heat pump water heaters (EcoCute), are gaining popularity in households. However, these devices have a problem: the vibration during their operation may loosen the bolt-and-nut jointing inside and outside the devices, resulting in the falling of bolts and nuts or the devices themselves.

Patent documents 1 and 2 propose methods for preventing the loosening of joints. Patent document 1 applies adhesive to the clearances in joints, while patent document 2 applies adhesive to the contact surfaces between bolts or nuts and the objects to be fastened.

However, the quantity of adhesive manually applied to the joint clearances varies, and adhesives degrade with time.

As a bonding method free of these problems, patent document 3 and non-patent document 1 propose the use of two-piece swage type fasteners comprising a pin and a collar in such a manner that the collar is swaged to the locking grooves of the pin.

In patent document 3 and non-patent document 1, the collar is swaged to the groove part of the pin by applying a relative force in the axial direction between the pin and the collar using a tool. Thus, the components are bonded together, realizing high strength and high resistance against vibration.

CITATION LIST

Patent Literature

Patent document 1 Japanese Unexamined Patent Application Publication No. H6-294419

Patent document 2 Japanese Unexamined Patent Application Publication No. 2005-315363

Patent document 3 Japanese Patent No. 4686130

Non-patent document 1 Alcoa Fastening Systems, Operations Department, Unshakable world of Huck fastening systems, http://www.asia.afshuck.net/jp/Fasteners.html (viewed on 2017 Jan. 4).

SUMMARY OF THE INVENTION

Technical Problem

The pins in patent document 3 and non-patent document 1 require a preliminary forming of holes for inserting the pins (see the holes (614a, 614b) in FIG. 17A) in the bonding objects, which places restrictions on bonding objects. This problem is explained below with reference to FIGS. 18 to 20.

FIG. 18 illustrates a method for fastening two components (416a, 416b) using the pin and the collar described in patent document 3 or non-patent document 1. This method forms a hole (616a) in one component (416a) and another hole (616b) in the other component (416b). The two holes (616a, 616b) are stacked on top of each other before inserting the conventional pin (2) from the upper side of the hole (616a) to the lower side of the hole (616b). Then the collar (304) is fitted around the shaft of the pin (2) protruding through the holes (616a, 616b). Finally the collar (304) is bonded to the shaft of the conventional pin (2) by swaging using a tool (not illustrated). If the conventional pin (2) is inserted from the lower side of the hole (616b), the components (416) may come apart before bonding the collar (304).

FIG. 19 shows a fastening of an H-shaped steel component (400a) and a U-shaped steel component or other U-shaped component (400b) so that their centerlines correspond. The U-shaped component (400b) allows forming a hole (600) on the centerline, but the H-shaped component (400a) does not allow forming a hole on the centerline because the web is positioned on the centerline. Therefore, this fastening structure is impossible.

FIG. 20 shows the fastening of a metal pipe (400a) and a U-shaped steel component or other U-shaped component (400b) so that their centerlines correspond. The U-shaped component (400b) allows forming a hole (600b), and the metal pipe (400a) also allows forming a hole (600a). However, after stacking the two holes (600a, 600b) on top of each other, it may be difficult to insert the conventional pin (2) from the lower side of the hole (600a) to the upper side of the hole (600b) if the metal pipe (400a) is long and therefore the insertion point is far from the ends of the metal pipe (400a).

Besides the above-described restrictions on bonding objects, there are other problems: the preliminary forming of holes for inserting pins in the bonding components may cause water leakage, sound leakage as well as strength decrease. In addition, long components have another problem: increased labor and cost for forming a large number of hole pairs (see FIGS. 21 to 24). One-point fastening by forming a single hole may cause the rotation of the components and the pin.

Furthermore, the pins in patent document 3 and non-patent document 1 may pose an obstacle in placing the fastened products; specifically, the pinheads facing each other may be an obstacle (see FIG. 25). This is the case, for example, when installing a natural refrigerant heat pump water heater or an air conditioner outdoor unit.

The present invention provides a fastening member for fastening two or more components, ensuring a high degree of freedom in terms of fastening positions and objects, reducing the number of holes, preventing the rotation of the components and the fastening member in one-point fastening, and maintaining high strength and resistance against vibration after fastening.

Solution to Problem (1) The present invention provides a fastening structure for fastening the first and second components, which comprises a first component, a pin that has non-helical grooves running in a circumferential direction and aligned along a longitudinal direction and whose one end in the longitudinal direction is bonded to the first component, a second component that has an insertion hole for inserting the pin, and a collar that is fitted around and bonded to the pin so that the second component is positioned between the collar and the first component, wherein said second component is prevented from rotating with respect to said pin.

The fastening structure according to the present invention comprises a pin and a collar that covers the pin to fasten the first and second components. The shaft of the pin has grooves running in a circumferential direction, but these grooves do not have a helical structure. That is, the adjacent grooves are not connected. Thus, the shaft of the pin is different from those of conventional screws and bolts with a helical groove continuous in a longitudinal direction. If the pin had a helical structure, a single groove would continue from the non-head end to the head of the pin, but according to the present invention, the grooves of the pin are independent lanes. That is, the adjacent grooves are not connected. This groove structure can prevent the loosening of the pin and the collar (described later) in engagement even in strongly vibrating environments, free from such a risk that ordinary screws may rotate in the direction opposite to the screwing direction.

One end in the longitudinal direction of the pin according to the present invention has a bonding part (chip) instead of a head that ordinary bolts or the like have. The bonding can be performed, for example, by welding and other processes. The first and second components are fastened together as follows: The bonding part of the pin is bonded to a part of the first component (a part for fastening the first and second components) by welding and other processes. The other end of the pin (opposite to the end welded to the first component) is inserted into an insertion hole preformed in the second component. The collar is fitted around the groove part of the pin protruding through the second component. Then the diameter of the collar is reduced to engage the inner wall of the collar with the grooves of the pin. Thus, the first and second components are fastened together using the pin. In this specification, welding may mean bonding.

When the pin welded to the first component has been inserted into the second component as described above, the pin never rotates in the second component. Thus, the components (the first and second components) and the fastening member (the pin and the collar) after fastening never rotate or loosen due to vibration or the like.

The non-helical grooves running in a circumferential direction and aligned in a longitudinal direction are substantially concentric with the central axis of the pin. The pin welded to the first component and inserted into the second component never rotates. That is, the pin cannot be screwed forward (or backward) for the following reasons: the pin is welded to the first component and cannot be screwed into the first component; unlike ordinary screws, the pin has a non-circular axial cross-section, specifically a polygonal or quadrangular axial cross-section, and the second component has a corresponding hole. In this specification, axial cross-section means the cross-section perpendicular to the axial direction of the pin.

Thus, the components and the fastening member after fastening never rotate or loosen due to vibration or the like.

The present invention bonds the pin to the first component, with no need to form a hole, at least in the first component. The use of the pin according to the present invention allows fastening the components (the first and second components) together even in parts where forming a hole is difficult.

Unlike conventional bolts, the pin according to the present invention does not have a head, but the pin is united with the first component by bonding it to the first component. Therefore, the fastening of the components (the first and second components) according to the present invention is possible if the second component has an insertion hole for the pin. That is, the first component does not need to have an insertion hole, provided that the first component can be bonded with the pin.

(2) The present invention provides the fastening structure according to (1), wherein the portion of said pin inserted into the insertion hole in said second component has a non-circular cross-section perpendicular to the longitudinal direction in at least a part or the whole of the portion.

The axial cross-section of the pin according to the present invention has a form designed to prevent the rotation of the pin inserted into the insertion hole in the component. This means that the maximum diameter of the axial cross-section of the pin is greater than the minimum diameter of the insertion hole, which prevents the rotation of the pin in the insertion hole. For example, the axial cross-section of the pin and the insertion hole of the component can have non-circular and substantially congruent forms so that the pin can be inserted into the insertion hole of the component. For example, the non-circular forms can be angular forms. The non-circular forms may include curved parts if they also include at least one straight part. For example, the axial cross-section of the pin and the insertion hole of the component can have substantially congruent quadrangular forms. The axial cross-section (the cross-section perpendicular to the axial direction of the pin) is the same in meaning as the cross-section perpendicular to the longitudinal direction.

(3) The present invention provides a fastening method for fastening the first and second components, wherein said fastening method comprises a pin that has non-helical grooves running in a circumferential direction and aligned along a longitudinal direction and that has a non-circular part along the longitudinal direction with a non-circular cross-section perpendicular to the longitudinal direction, and a collar that is fitted around the pin, and includes the following steps: said pin is united with said first component by bonding one end of said pin along the longitudinal direction to said first component; said second component with an insertion hole for inserting said pin is fitted around said non-circular part along the longitudinal direction from the other end of said pin along the longitudinal direction; said collar is fitted around said pin, which has penetrated said second component, from the other end of said pin along the longitudinal direction; and said pin and said collar are bonded together.

When fastening the first and second components together, the method according to the present invention unites the pin with one of the first and second components by bonding the pin to that component, while the other component has an insertion hole for inserting the pin. In this method, the other component that has the pin inserted cannot rotate with respect to the pin. Further, the collar is fitted around the other end in the longitudinal direction (opposite to the bonded end) of the pin that has penetrated the other component, followed by the swaging of the collar to the pin. Thus, the rotation of the components (the first and second components) and the pin can be prevented, maintaining high strength and resistance against vibration.

The component (the first or second component) to which the pin should be bonded can be chosen, for example, as follows: the pin is preferably bonded to the component that poses more difficulty—due to a ring-like form of the component or other reasons—with forming an insertion hole, inserting the pin into the insertion hole, and swaging the protruding side with the collar.

As in (1), the non-helical grooves running in a circumferential direction and aligned in a longitudinal direction are substantially concentric with the central axis of the pin. As in (2), the cross-section perpendicular to the longitudinal direction is the axial cross-section (the cross-section perpendicular to the axial direction of the pin).

Advantageous Effects of Invention

The present invention provides a fastening member for fastening the first and second components, ensuring a high degree of freedom in terms of fastening positions and objects, reducing the number of holes, preventing the rotation of the components and the fastening member in one-point fastening, and maintaining high strength and resistance against vibration after fastening.

When fastening the first and second components together, the widely adopted method, specifically two-point fastening using bolts and nuts, forms a total of four holes in the first and second components. In contrast, the method according to the present invention forms only one hole in the second component. The drastic reduction of holes to one-fourth has significant impact.

BRIEF DESCRIPTION OF THE DRAWINGS

FIG. 1 shows the fastening member (a pin and a collar) in an embodiment of the present invention.

FIG. 2 is a perspective view of the fastening member (a pin and a collar) in an embodiment.

DETAILED DESCRIPTION OF THE PREFERRED EMBODIMENTS

Figure 3A:
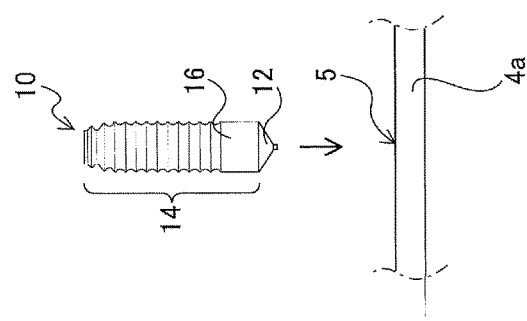
FIGS. 3A to 3C show the fastening procedure for fastening components using the fastening member in an embodiment.

Below is a description of the fastening member (1) in an embodiment of the present invention with reference to FIGS. 1 and 2. As shown in FIG. 1, the fastening member (1) comprises a pin (10) and a collar (30). The pin (10) has a bonding part (12) and a shaft (14). The bonding part (12) has a cone form, and the top is provided with a protrusion. The bonding part (12) is a tip in welding, and there are no special restrictions on the form of the bonding part (12) (the details will be described later). The shaft (14) has, at a minimum, a groove part (18) and a non-welding end ridge part (20). The non-welding end ridge part (20) corresponds to three or so ridges at the non-welding end. How the pin (10) and the collar (30) fasten the components (4) will be described later.

FIG. 2 is a perspective view of the fastening member (1) in this embodiment. FIG. 2 is a perspective view of the pin (10), and FIG. 2 is a perspective view of the collar (30). As shown in FIG. 2, the shaft (14) of the pin (10) in this embodiment has a quadrangular axial cross-section.

Unlike the groove part (18), the pillar part (16) does not need grooves because the pillar part (16) does not engage with the collar (30). However, the pillar part (16) may have grooves from the base (see FIG. 12).

Unlike ordinary screws, the grooves of the groove part (18) in this embodiment do not have a helical structure. That is, the grooves are independent lanes and each has a ring form. Thus, the adjacent grooves are not connected. The grooves are formed according to the length of the shaft (14), nearly reaching the non-welding end of the shaft (14).

The independent grooves of the groove part (18), or the unconnected adjacent grooves, prevent the screwed pin (10) from rotating in the direction opposite to the screwing direction and thus loosening due to vibration and the like after two or more components (the components (4) in this embodiment, which will be described later) are fastened together using the fastening member (1) (the pin (10) and the collar (30)).

The collar (30) shown in FIG. 2 has a quadrangular inner wall corresponding to the form of the pin (10). The form of the collar (30) is suitable if the groove part (18) of the pin (10) can engage with the collar (30) in the swaging described below. Possible variations of the collar will be described later (see FIG. 16).

The following is a description of the procedure for fastening components (4) using the fastening member (1) according to the present invention, more specifically the procedure for fastening the first and second components (4a, 4b) using the pin (10) and the collar (30), with reference to FIGS. 3 and 4. These figures show the cross-section of the components (4) to be fastened (the cross-section is simply shown without hatching or the like). In this embodiment, the components (4) to be fastened are the first and second components (4a, 4b).

The first component (4a) is a planar component to which the bonding part (12) of the pin (10) can be welded. The second component (4b) is a planar component with an insertion hole (6) for inserting the pin (10). The form of the insertion hole (6) corresponds to the cross-section of the pin (10) (specifically the pillar part (16)). This means that when the pin (10) is inserted into the insertion hole (6), the outer circumferential surface of the pin (10) (specifically the pillar part (16)) comes into substantial contact with the inner circumferential surface of the insertion hole (6).

In this embodiment, the first and second components (4a, 4b) are planar components. However, this is not an absolute requirement. It is also possible that those components have a planar part that allows the welding or insertion of the pin (10), or that the components do not have a planar part but have a form that allows the welding or insertion of the pin (10).

As shown in FIG. 3A, the pin (10) is welded to the fixation position (5) of the first component (4a). In this embodiment, the bonding part (12) of the pin (10) is directed and welded to the fixation part (5) of the first component (4a) so that the shaft (14) of the pin (10) stands substantially vertically on the surface of the component (4a). The fixation position (5) is determined depending on which part the first and second components (4a, 4b) are fastened. The welding is performed by momentarily conducting electricity using an instant welding machine (not illustrated), for example, a stud welding machine.

Figure 3B:
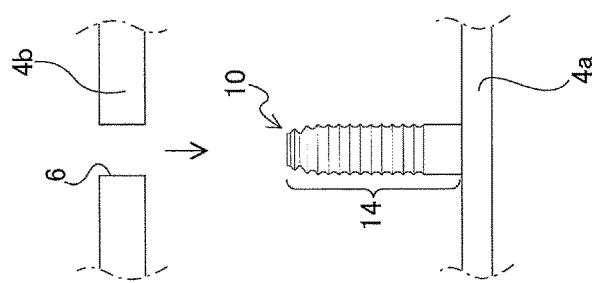

As shown in FIG. 3B, the pin (10) is welded to the first component (4a) so that the shaft (14) of the pin (10) stands substantially vertically on the surface of the first component (4a), and the shaft (14) of the pin (10) thus united with the first component (4a) is inserted into the insertion hole (6) in the second component (4b).

What is important here is the form of the insertion hole (6) in the second component (4b). This is important for preventing the relative rotation of the second component (4b) with respect to the pin (10). For example, if the minimum distance from the center of the insertion hole (6) to the inner circumferential surface of the insertion hole (6) is greater than the maximum distance from the center of the shaft (14) of the pin (10) to the outer circumferential surface of the shaft (14) of the pin (10), the fastening of the first and second components (4a, 4b) using the pin (10) and the collar (30) may result in a relative rotation of the second component (4b) with respect to the pin (10) (consequently the first component (4a)).

Therefore, the form of the insertion hole (6) preferably corresponds to the pillar part (16), as described above. However, there can be a clearance (for example, 0 to 2.0 mm) between the pin (10) and the insertion hole (6) to the extent that the pin (10) inserted into the insertion hole (6) does not rotate. The requirement is to prevent the idle rotation of the second component (4b) with respect to the pin (10) when the pin (10) is inserted into the second component (4b).

Figure 3C:
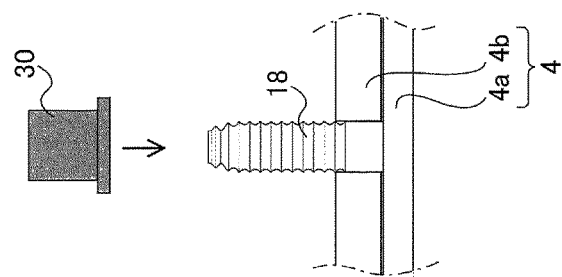
Figure 4D:
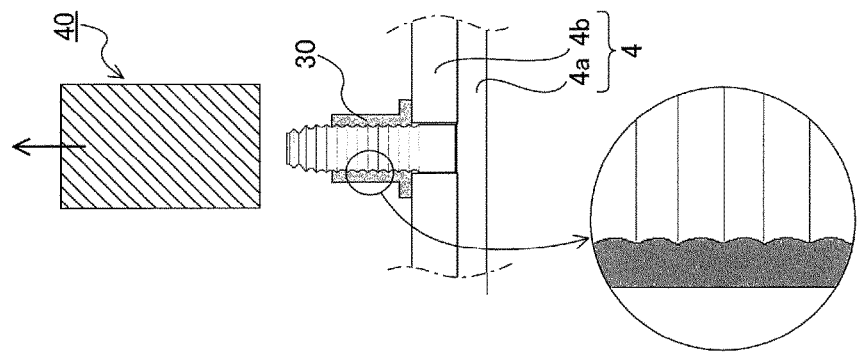
FIGS. 4A to 4D show the fastening procedure for fastening components using the fastening member in an embodiment (continued from FIG. 3).
Figure 4C:
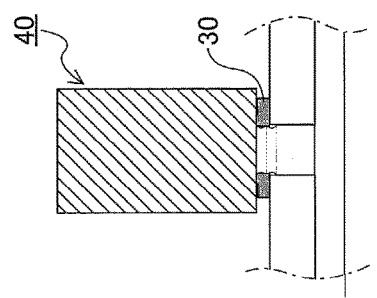
Figure 4B:
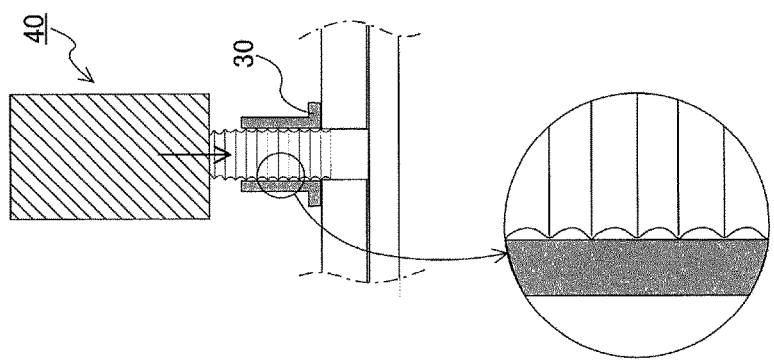
Figure 4A:
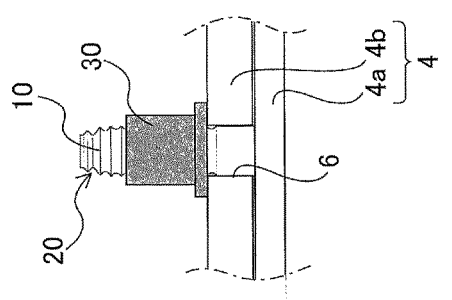

When the pin (10) has been inserted into the insertion hole (6) in the second component (4b), the collar (30) is fitted around the groove part (18) protruding through the second component (4b), as shown in FIGS. 3C and 4A. The inner wall of the collar (30) at this time does not have anything like concavities and convexities that engage with the groove part (18). This means that the collar (30) merely fitted around the groove part (18) can come off of the pin (10).

FIGS. 4B to 4D illustrate the swaging of the collar (30). FIGS. 4B to 4D partially show the cross-section of the insertion hole (6) and the collar (30) for the purpose of convenience (the cross-section is simply shown without hatching or the like). The swaging tool is not illustrated in detail.

An example of an installation tool for swaging is Bob-Tail® (Alcoa Fastening Systems, USA). The installation tool (40) has a grabber (not illustrated), which grabs the non-welding end ridge part (20) of the pin (10) and drags this to the side of the installation tool (40). Thus, the pin (10) is elongated.

As shown in FIG. 4C a swaging anvil (not illustrated) wraps around the collar (30) and swages this in the direction of the groove part (18) of the pin (10) (inward). Thus, the gap between the collar (30) and the pin (10) is closed, and the groove part (18) of the pin (10) bites into the inner wall of the collar (30) (swaging). The swaging reduces the diameter of the collar (30). The collar (30) becomes thinner and longer, and the pin (10) is elongated as described above, generating an axial force in the fastening member (1).

After the swaging of the collar (30) to the pin (10) using the installation tool (40) (see the enlarged illustration in FIG. 4D), the installation tool (40) is taken off of the pin (10), as shown in FIG. 4D. Through the process described above, the fastening of the first and second components (4a, 4b) using the pin (10) and the collar (30) is completed.

As explained above, this embodiment unites the pin (10) with the first component (4a) by welding the pin to the first component. An advantage is that if one of the components (4) (the second component (4b) in this embodiment) has a hole (an insertion hole (6)) formed, this will be sufficient. In addition, the pin (10) inserted into the insertion hole (6) (consequently the first component (4a)) is prevented from rotating with respect to the second component (4b). Furthermore, the non-helical structure of the groove part (18) of the pin (10) prevents the pin (10) from loosening like an ordinary screw while the pin (10) is in engagement with the collar (30). The swaging of the collar (30) to the pin (10) allows maintaining the firm fixation even in strongly vibrating environments.

Thus, the present invention provides a fastening structure for fastening the first and second components (4a, 4b), which comprise a first component (4a), a pin (10) that has non-helical grooves running in a circumferential direction and aligned along a longitudinal direction and whose one end in the longitudinal direction is bonded to the first component (4a), a second component (4b) that has an insertion hole (6) for inserting the pin (10), and a collar (30) that is fitted around and bonded to the pin (10) so that the second component (4b) is positioned between the collar (30) and the first component (4a), wherein said second component (4b) is prevented from rotating with respect to said pin (10).

The present invention provides the fastening structure described above, wherein the portion of said pin (10) inserted into the insertion hole (6) in said second component (4b) has a non-circular cross-section perpendicular to the longitudinal direction in at least a part or the whole of the portion.

Such a fastening structure can prevent the relative rotation of the second component (4b) with respect to the first component (4a) (the pin (10)) after fastening these components (4a, 4b). There is no need for two-point fastening.

In this case, one-point fastening of the first and second components (4a, 4b) using the pin (10) and the collar (30) can prevent the relative rotation of the second component (4b) with respect to the first component (4a). The pin (10) never loosens from the components (4), allowing maintaining the strong fastening between the first and second components (4a, 4b) after fastening these components (4a, 4b).

The fastening structure described above can be used to fasten three or more components instead of two components (the first and second components (4a, 4b) in this embodiment).

The present invention provides a fastening method for fastening the first and second components (4a, 4b), wherein said fastening method comprises a pin (10) that has non-helical grooves running in a circumferential direction and aligned along a longitudinal direction and that has a non-circular part along the longitudinal direction with a non-circular cross-section perpendicular to the longitudinal direction, and a collar (30) that is fitted around the pin (10), and includes the following steps: said pin (10) is united with said first component (4a) by bonding one end of said pin (10) along the longitudinal direction to said first component (4a); said second component (4b) with an insertion hole (6) for inserting said pin (10) is fitted around said non-circular part along the longitudinal direction (pillar part (16)) from the other end of said pin (10) along the longitudinal direction; said collar (30) is fitted around said pin (10), which has penetrated said second component (4b), from the other end of said pin (10) along the longitudinal direction; and said pin (10) and said collar (30) are bonded together.

Such a fastening method has the advantage that an insertion hole (6) in the second component (4) alone will be sufficient because the first component (4a) and the pin (10) are united together. This reduces the labor for forming holes and prevents the cost increase and strength deterioration due to the forming of holes. Even one-point fastening of the first and second components (4a, 4b) using the pin (10) and the collar (30) can prevent the relative rotation of the second component (4b) with respect to the first component (4a).

Figure 5:
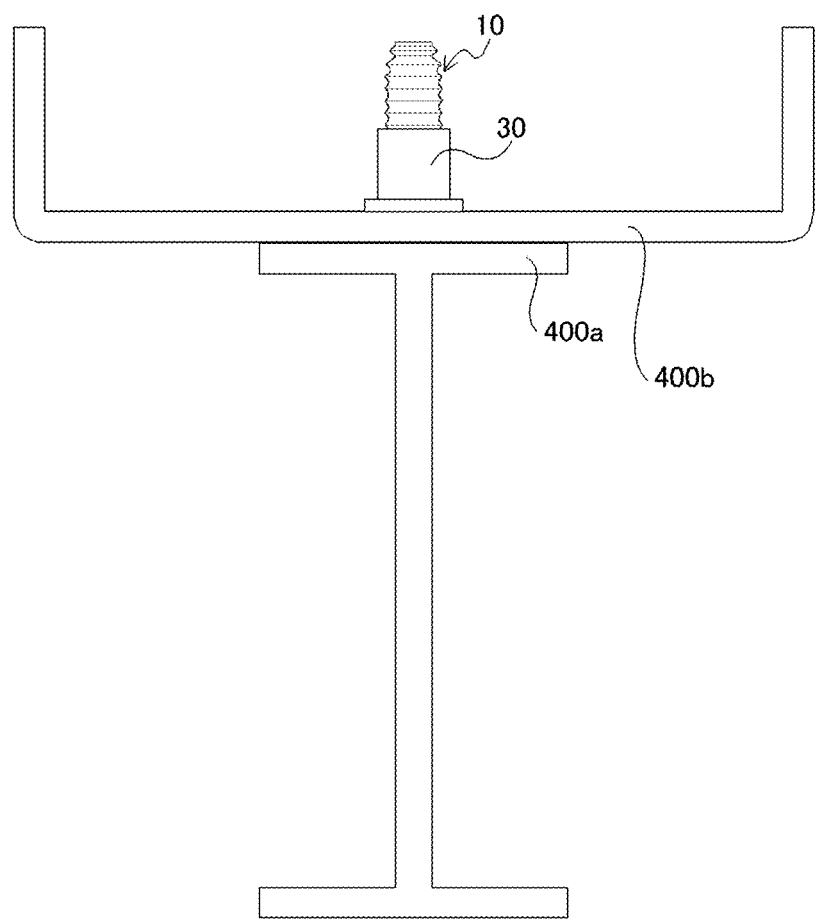
FIG. 5 shows the fastening structure in an embodiment.

FIGS. 5 to 8 show examples of the fastening method for fastening the first and second components using the pin (10) and the collar (30) in this embodiment. In FIG. 5, the first component (400a) is an H-shaped steel component, and the second component (400b) is a U-shaped steel component or other U-shaped component. The first component (400a) has a web and two plate-like flange portions respectively connected to two ends of the web. In other words, the web is connected to a back surface of the flange portion. As shown in FIG. 5, the first and second components (400a, 400b) can be fastened together using the pin (10) and the collar (30) according to the present invention without forming a hole (an insertion hole) in the center of the first component (400a) (the H-shaped steel component). The pin (10) is perpendicular to the flange portion and aligned to the web.

Figure 6:
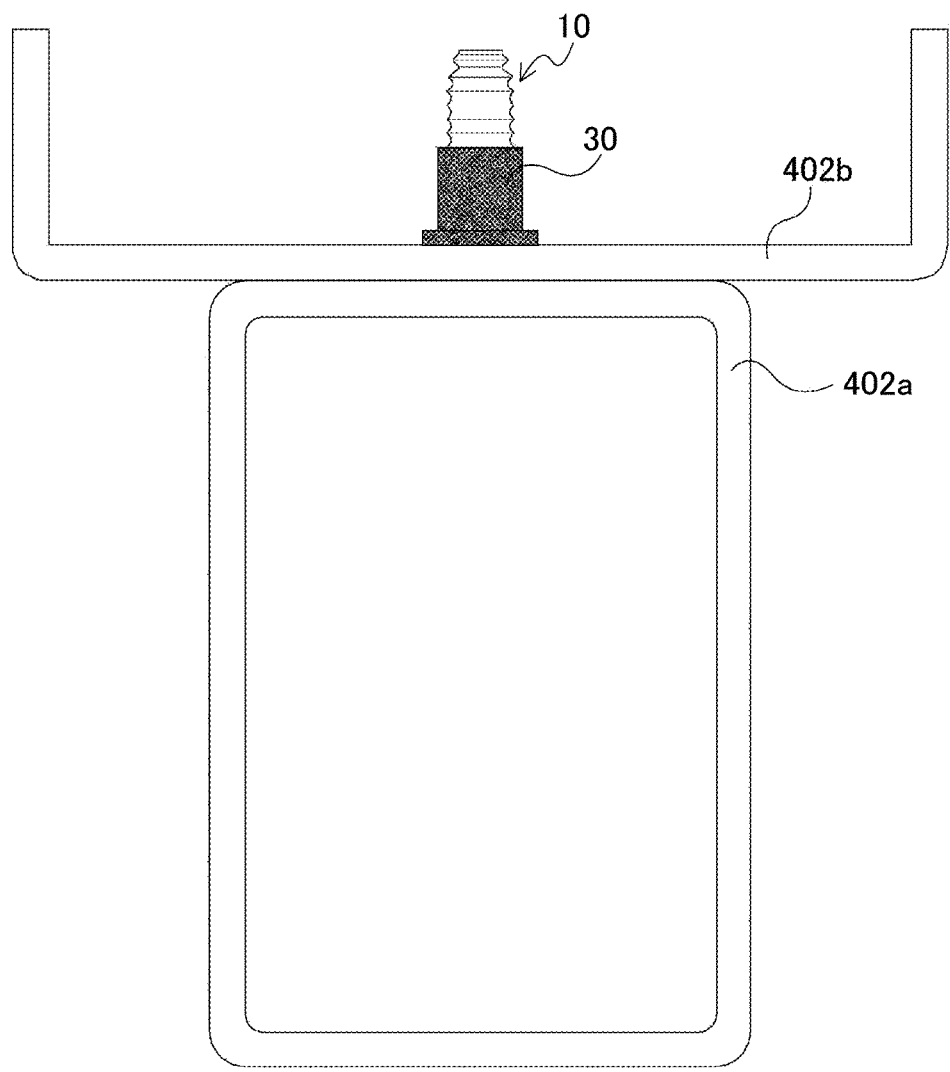
FIG. 6 shows the fastening structure in an embodiment.

In FIG. 6, the first component (402a) is a metal pipe, and the second component is a U-shaped steel component. As shown in FIG. 6, the first component (402a) (a metal pipe with a closed cross-section) and the second component (402b) (a U-shaped steel component) can be fastened together using the pin (10) and the collar (30) according to the present invention.

Figure 7:
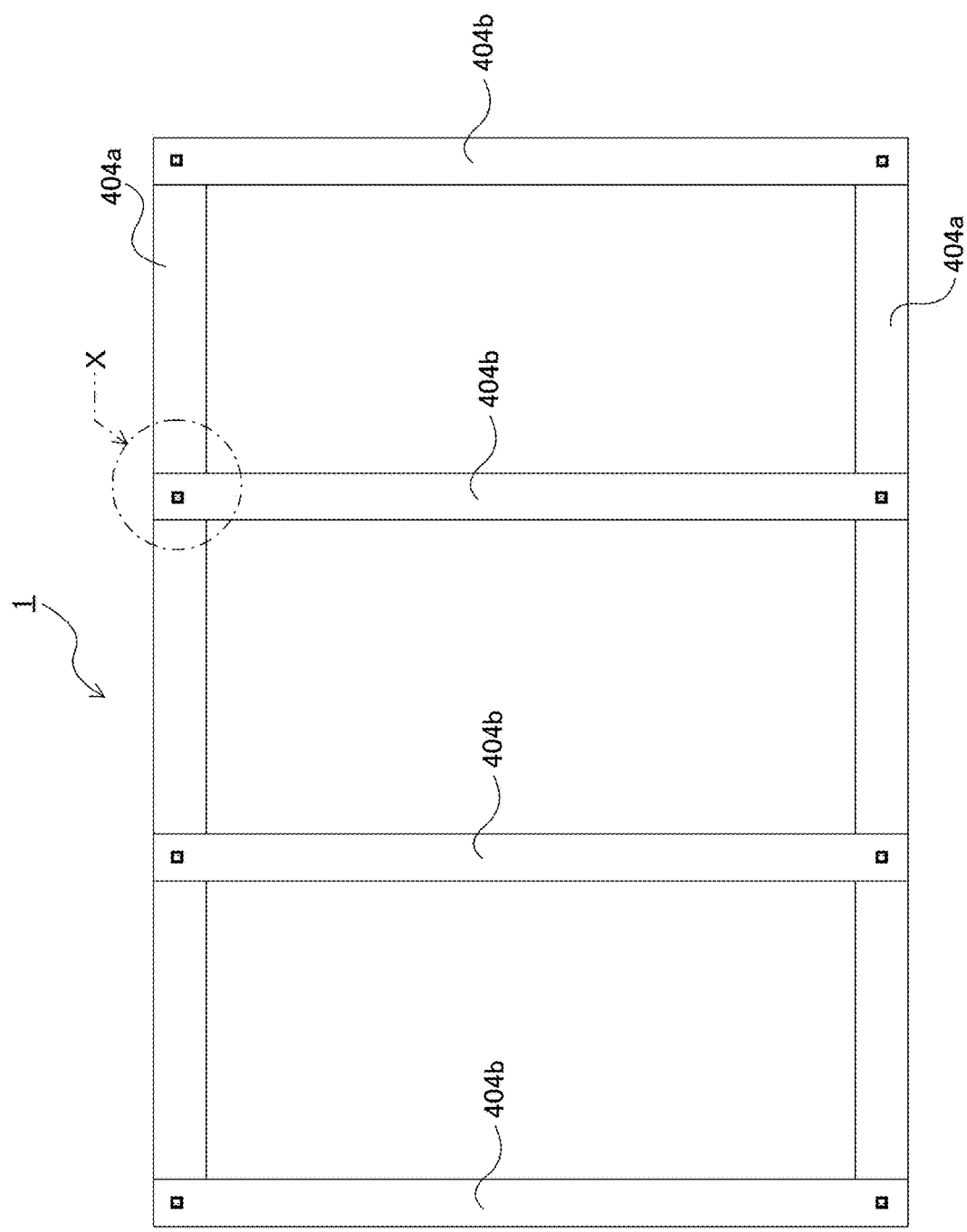
FIG. 7 shows an example of fastening using the pins and the fastening method in an embodiment.
Figure 8:
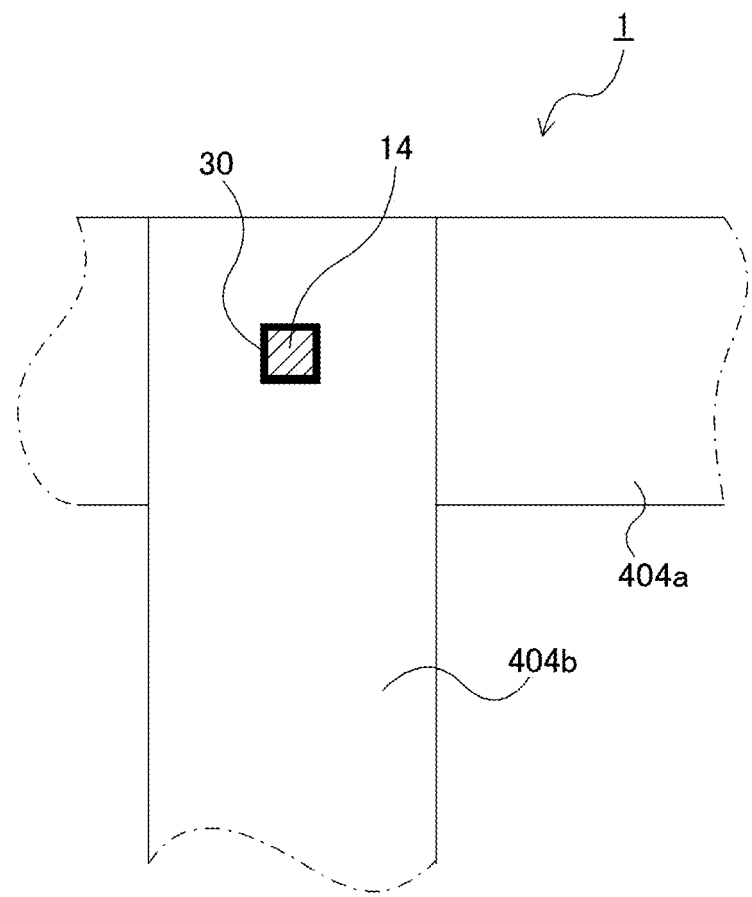
FIG. 8 is an enlarged view of part X, which is shown surrounded by a dotted dashed line in FIG. 7.

FIG. 7 shows a one-point fastening of the components, and FIG. 8 is an enlarged view of fastening part X (the area surrounded by a dotted dashed line) in FIG. 7. In FIGS. 7 and 8, the pin (10) with a non-circular cross-section (a square cross-section in FIGS. 7 and 8) is united with the first component (404a) by welding the pin (10) to the first component (404a) so that the pin (10) is positioned substantially perpendicular to the surface of the first component (404a). Then the pin (10) is inserted into an insertion hole (60) (not illustrated) in the second component (404b) whose form corresponds to the cross-section of the pin (10), followed by swaging with the collar (30). Thus, even one-point fastening of the first and second components (404a, 404b) can prevent the relative rotation of the second component (404b) with respect to the pin (10) (the first component (404a)), reducing the number of fasteners as well as construction time and cost.

Figure 9:
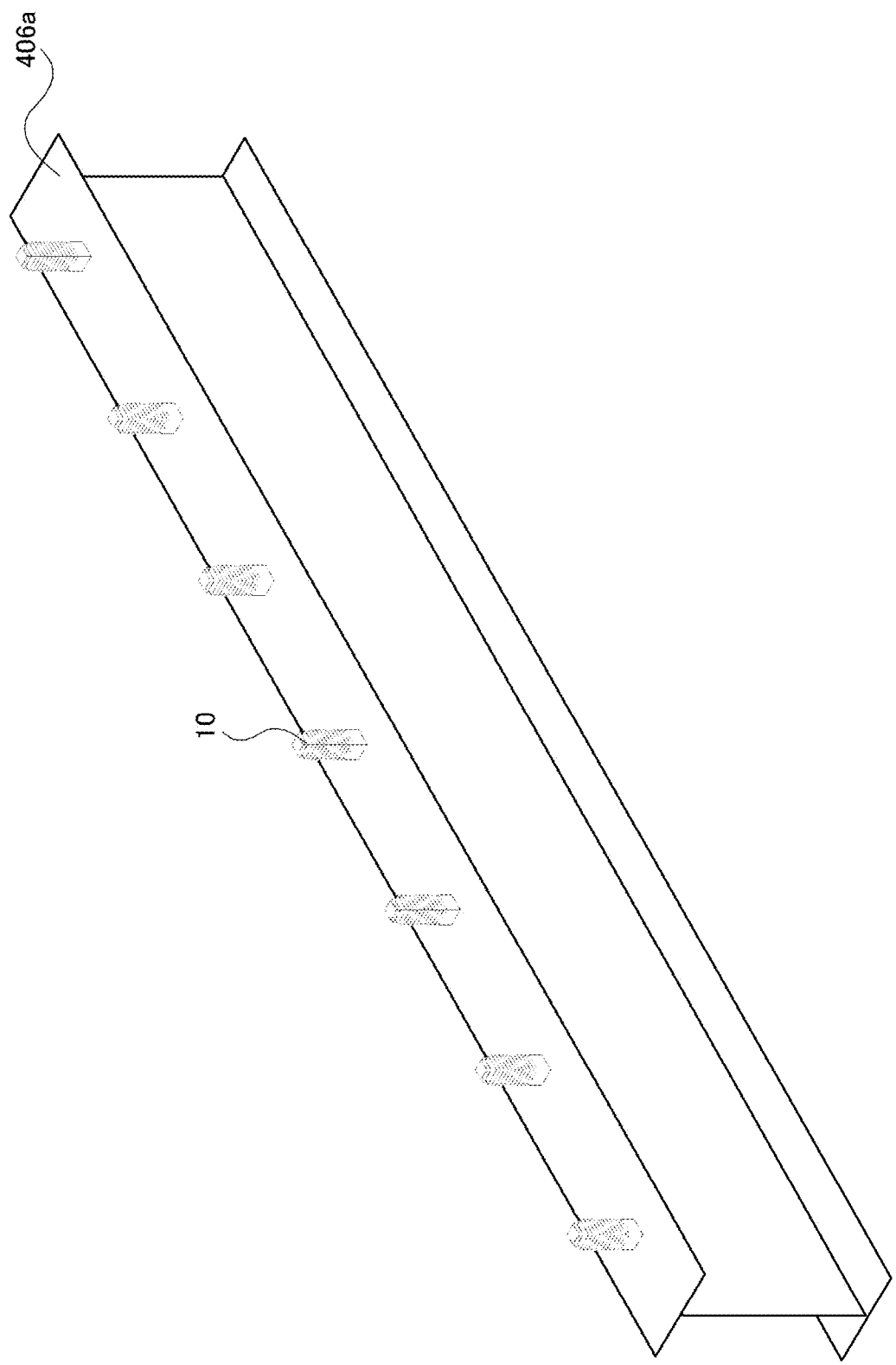
FIG. 9 shows the pins bonded to a first component by welding and other processes.
Figure 10:
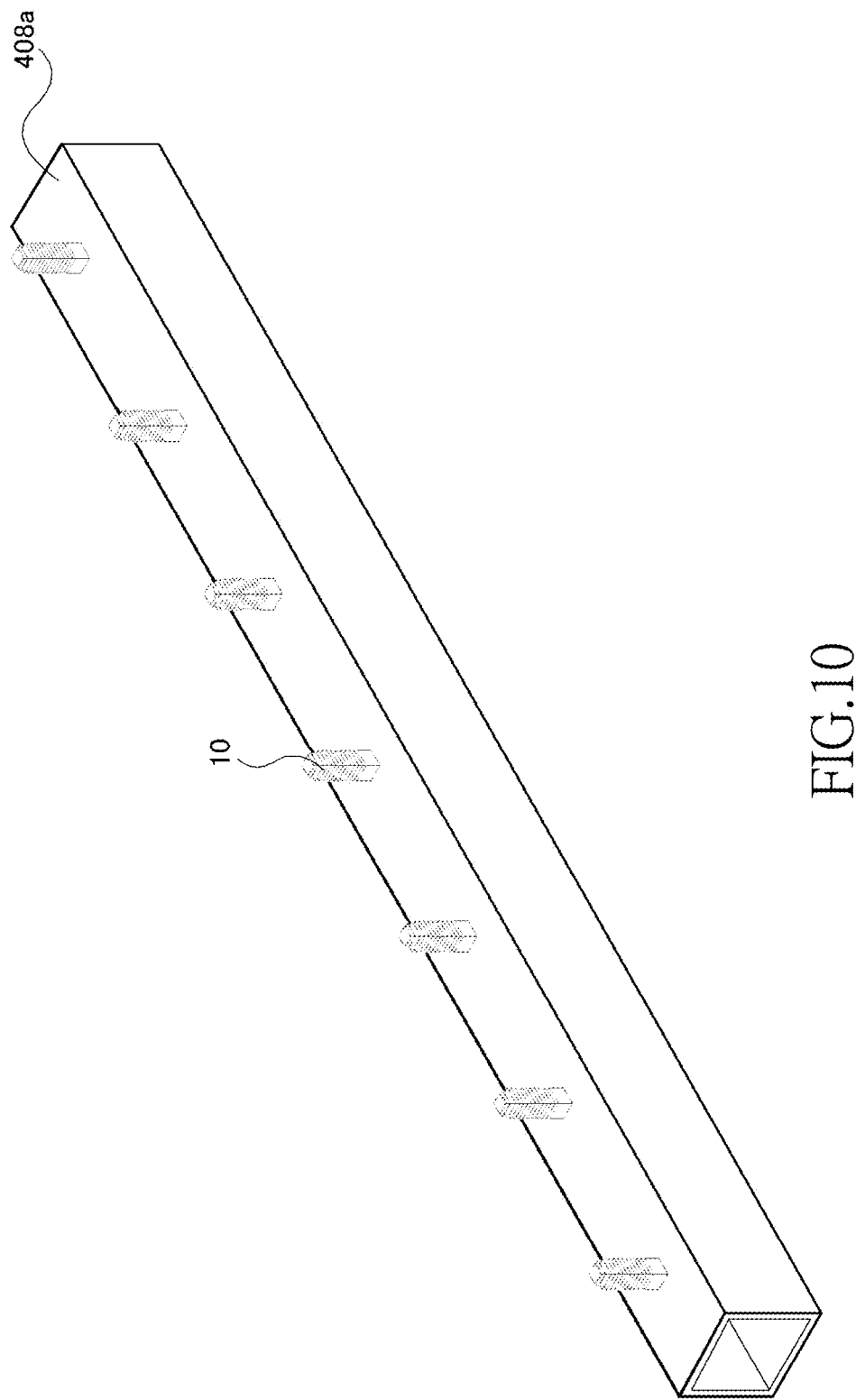
FIG. 10 shows the pins bonded to a first embodiment by welding and other processes.

In FIGS. 9 and 10, some pins (10) are bonded to the first component (406a, 408a) by welding and other processes. The fastening method using pins (10) and collars (30) in this embodiment makes it possible to determine the precise positioning of the pins (10) beforehand in a factory, not at the very moment and place of fastening. The pins (10) shown in FIGS. 9 and 10 are the same as the pin (10) described before and have a quadrangular cross-section perpendicular to the longitudinal direction.

Figure 11:
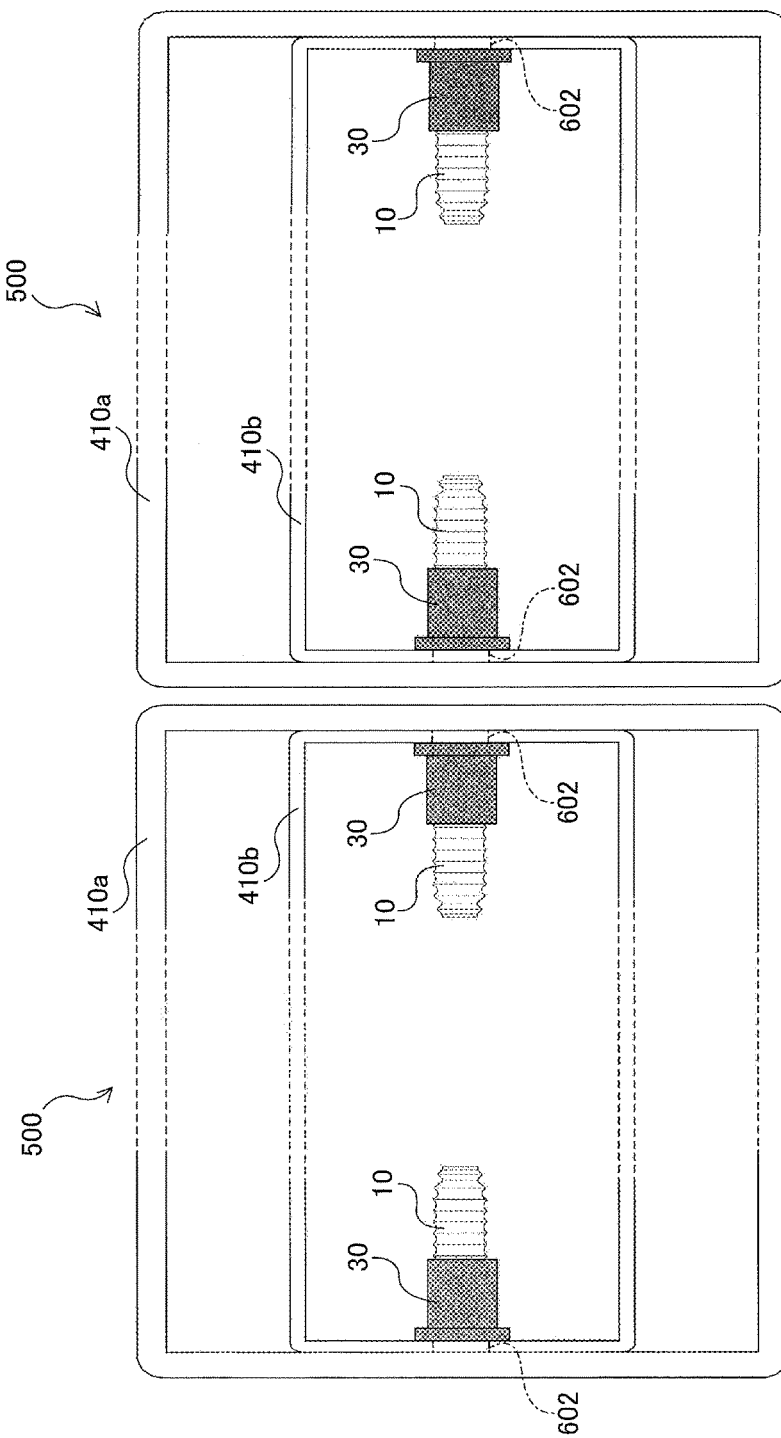
FIG. 11 shows the fastening structure in an embodiment.

In FIG. 11, the pins (10) in this embodiment are united with the first component (410a) by welding the pins (10) to the first component (410a) so that the pins (10) are positioned substantially perpendicular to the surface of the first component (410a). Then the pins (10) are inserted into insertion holes (602) in the second component (410b) whose form corresponds to the cross-section of the pins (10), followed by swaging with the collars (30). FIG. 11 shows two thus fastened products (500) placed back to back. The adjacent placement of the two fastened products shown in FIG. 11 is possible because the first component (410a) of each fastened product (500) maintains the flat surface while the opposite surface has the pin (10) welded.

Other Embodiments

Figure 12:
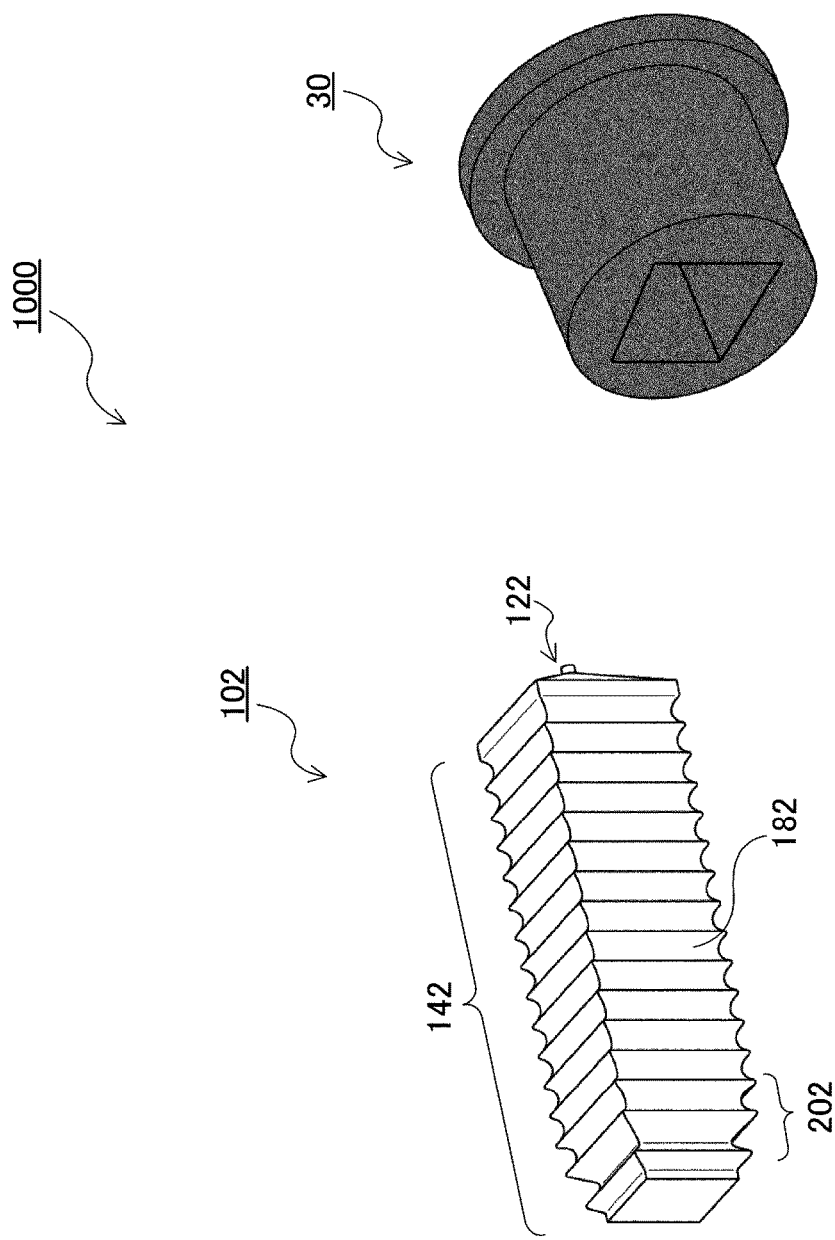
FIG. 12 shows a modified example of the pin.

The pin (10) in the embodiment described above has a shaft (14) including a pillar part (16), as shown in FIGS. 1 to 4. However, this is not an absolute requirement. FIG. 12 shows an example in which the groove part (182) covers the whole shaft (142). Because the groove part (182) covers the whole shaft (142), the method in this embodiment can fasten even thin components (for example, with a thickness of 0.1 to 2.3 mm) together.

Figure 13:
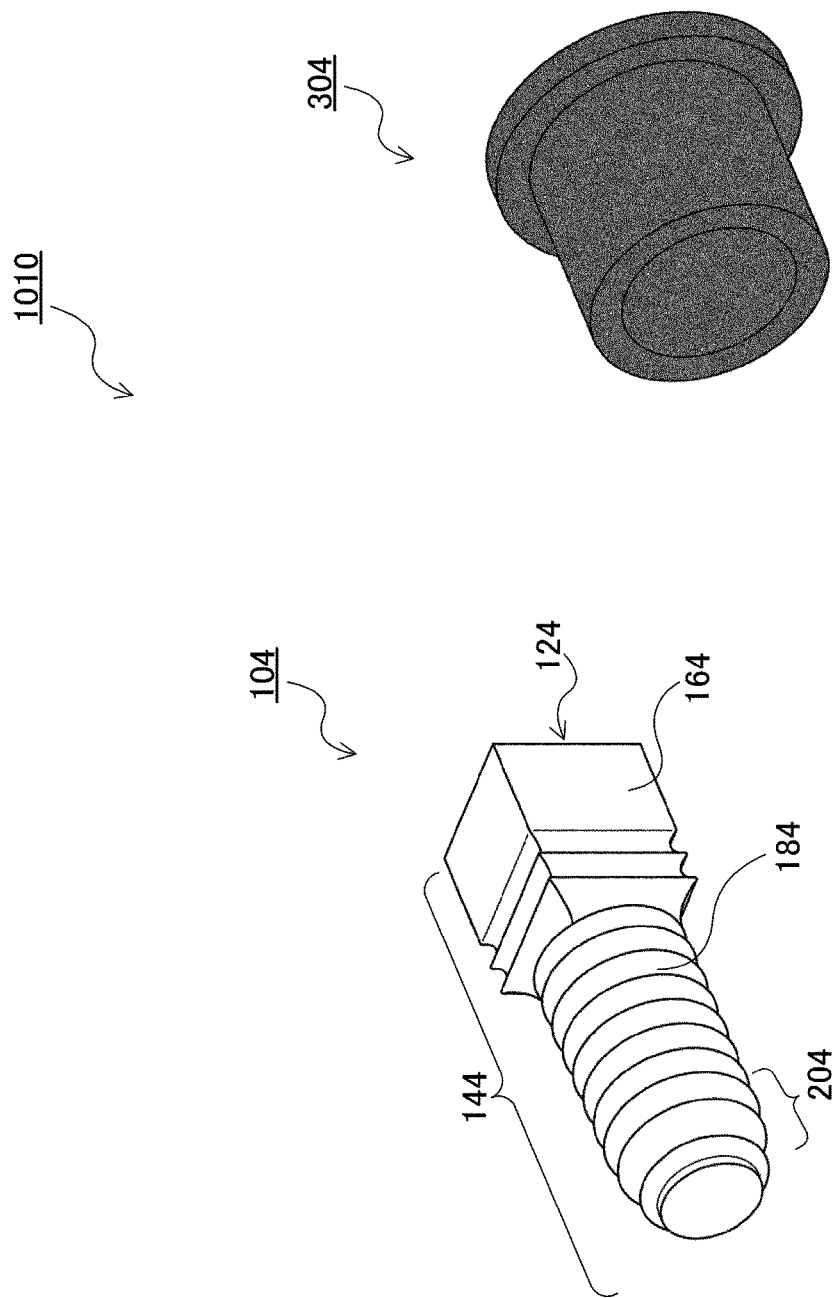
FIG. 13 shows a modified example of the pin.

When the pin (10) is inserted into the insertion hole (6) (see FIG. 3), the portion (the groove part (184) and the non-welding end ridge part (204) in FIG. 13) of the shaft (14) protruding from the first component (4a) may have a nonangular axial cross-section. When the pin (104) is inserted into the insertion hole (6) in the second component (4b), the relative rotation of the second component (4b) with respect to the pin (104) can be prevented if the portion (the pillar part (164) or the shaft (144)) in contact with the second component (4b) has a quadrangular form.

Especially, the groove part (184) of the pin (104) protruding from the first component (4a) can have a form that easily engages with the collar (30) described below. For example, the groove part (184) can have a circular axial cross-section. The concern about the groove part (184) is the engagement with the collar (30), not the relative rotation of the second component (4b) with respect to the pin (104).

Figure 14:
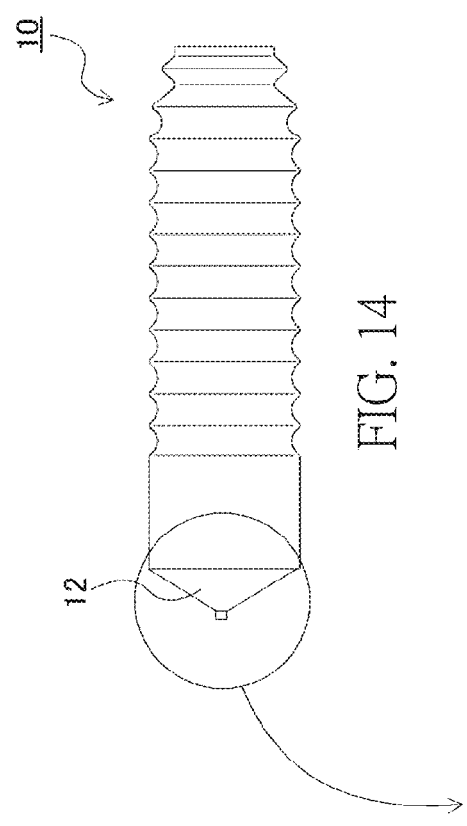
FIG. 14 shows a side view of the pin.
Figures 14A, 14B, 14C, 14D, 14E, 14F:
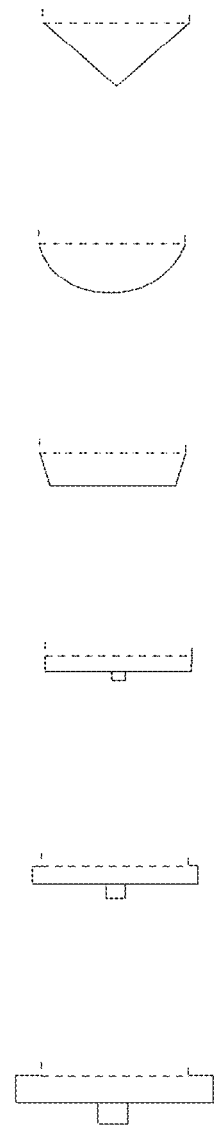
FIGS. 14A to 14F show modified examples of the bonding part of the pin.

As shown in FIG. 14, the bonding part (12) of the pin (10) may have a form different from the form shown in FIGS. 1 to 3. The bonding part (12) should have a form suitable for welding the pin (10) to the first component (4a) using an instant welding machine such as a stud welding machine (a form that allows easy electric conduction). FIGS. 14A to 14F shows possible examples of the bonding part of the pin.

The original embodiment uses an instant welding machine such as a stud welding machine to bond the pin (10) to the first component (4a). However, this is not an absolute requirement. Any method will do if it can bond the pin (10) to the first component (4a).

Figure 15A:
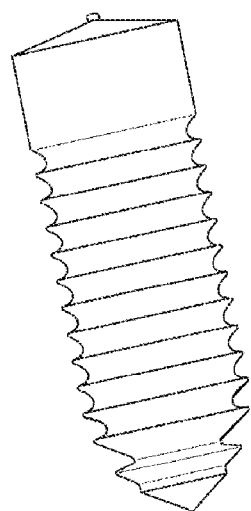
FIGS. 15A to 15E show modified examples of the pin.
Figure 15B:
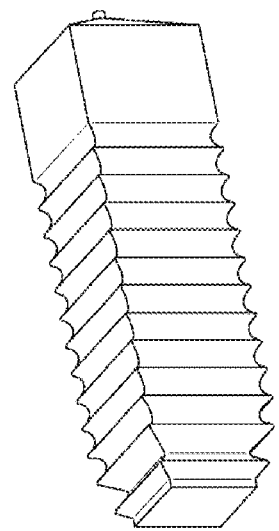
Figure 15C:
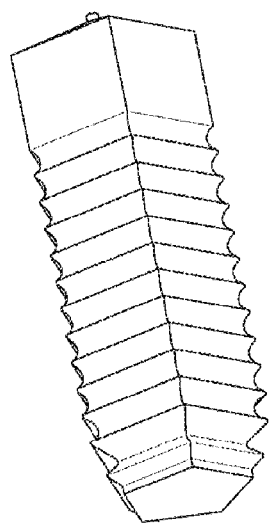
Figure 15D:
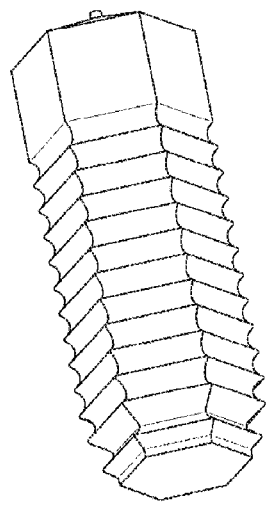
Figure 15E:
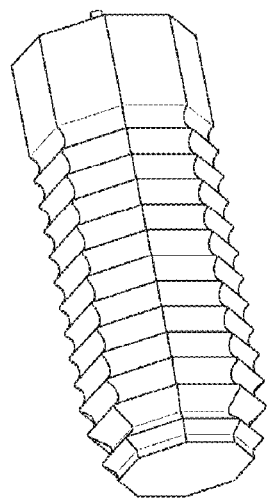

In FIGS. 1 to 4, the pin (10) has an angular, more specifically, quadrangular axial cross-section. However, this is not an absolute requirement. If the pin (10) can engage with the collar (30) through swaging, the axial cross-section of the pin (10) can be in other forms. As shown in FIGS. 15A to 15E, the axial cross-section of the pin (10) can be triangular (as shown in FIG. 15A), pentagonal (as shown in FIG. 15C), hexagonal (as shown in FIG. 15D), octagonal (as shown in FIG. 15E) and so forth. The angular part of the shaft (14) of the pin (10) may include a circular form. The minimum requirement in designing the pin (10) is to prevent the relative rotation of the second component (4b) with respect to the pin (10) when the pin (10) is inserted into the insertion hole (6) (and after the fastening).

Figure 16C:
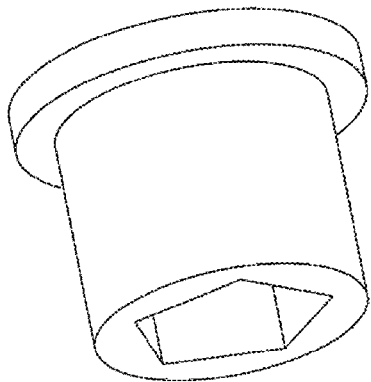
FIGS. 16A to 16F show modified examples of the collar.
Figure 16F:
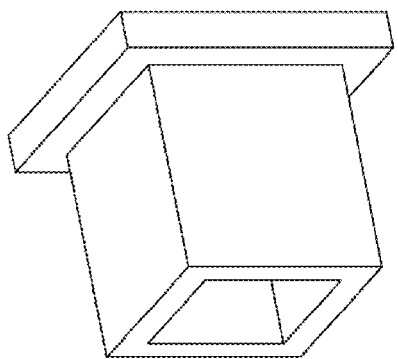
Figure 16B:
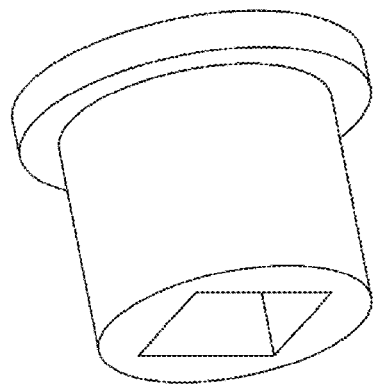
Figure 16E:
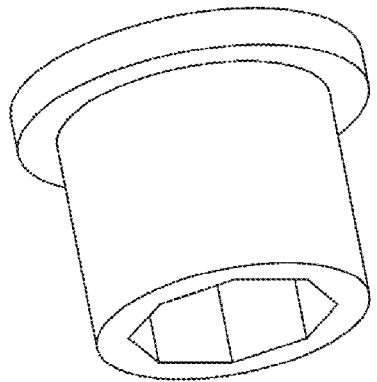
Figure 16A:
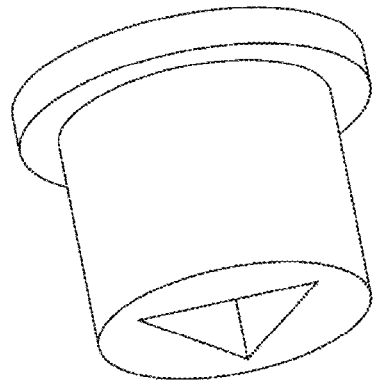
Figure 16D:
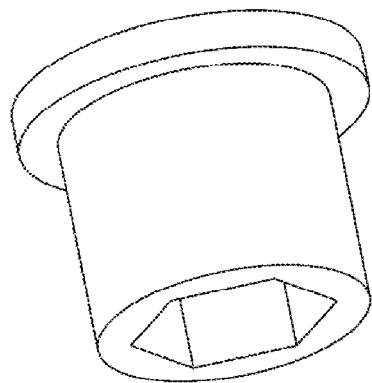
Figures 17A, 17B:
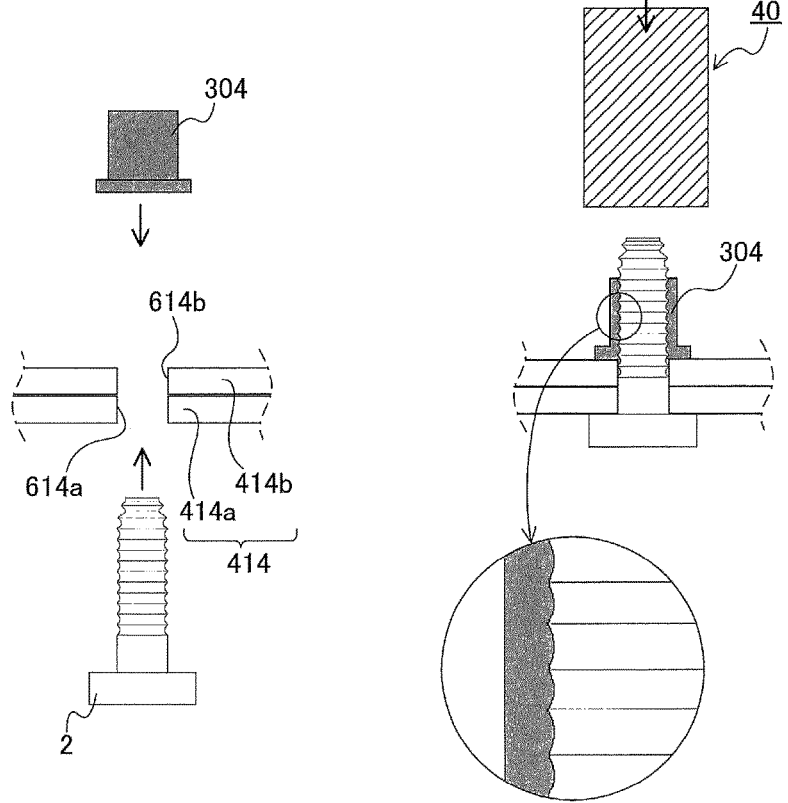
FIGS. 17A to 17B show a fastening procedure for fastening components using a conventional pin.
Figure 18:
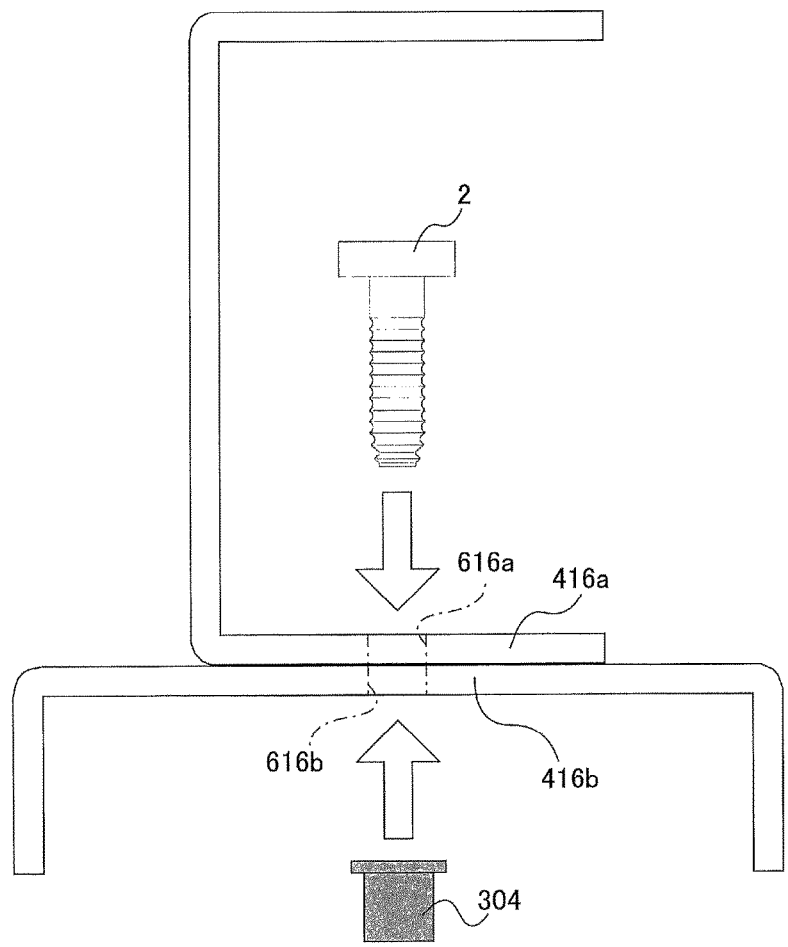
FIG. 18 shows a fastening of components using a conventional pin.
Figure 19:
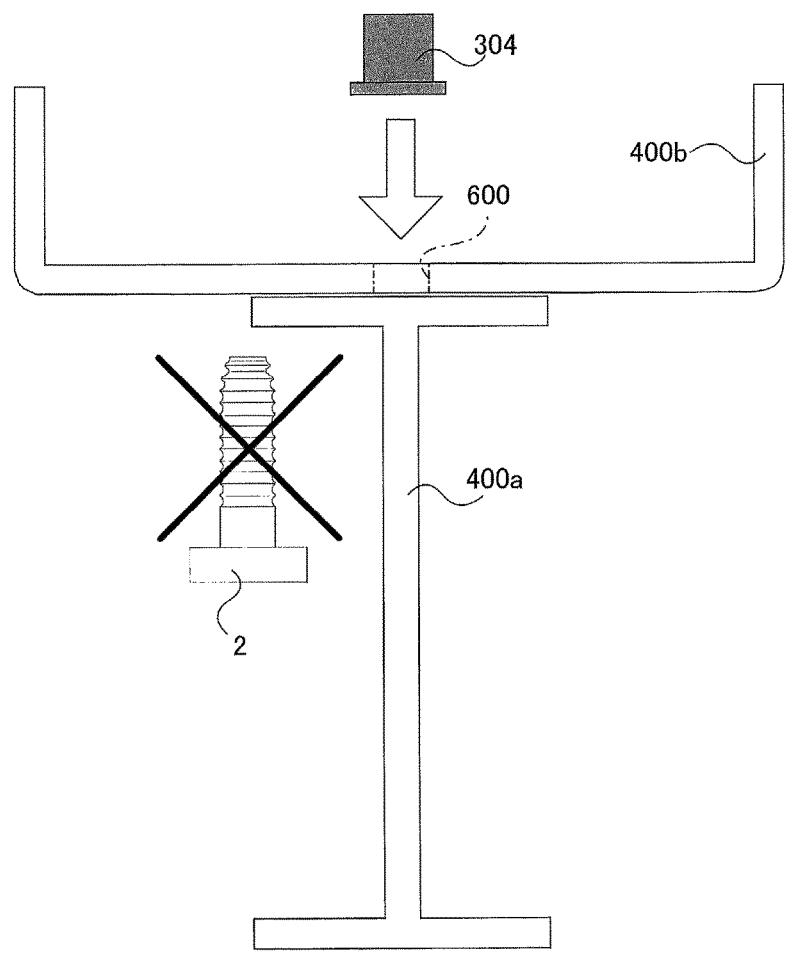
FIG. 19 shows a problem in fastening components using a conventional pin.
Figure 20:
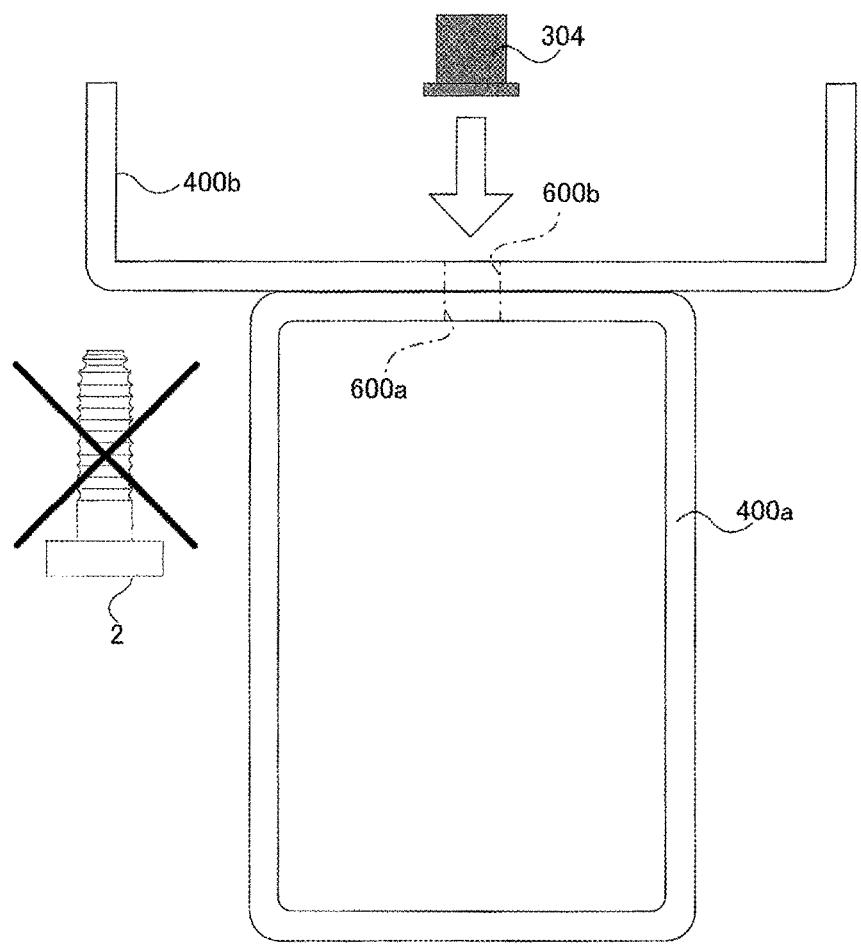
FIG. 20 shows a problem in fastening components using a conventional pin.
Figure 21:
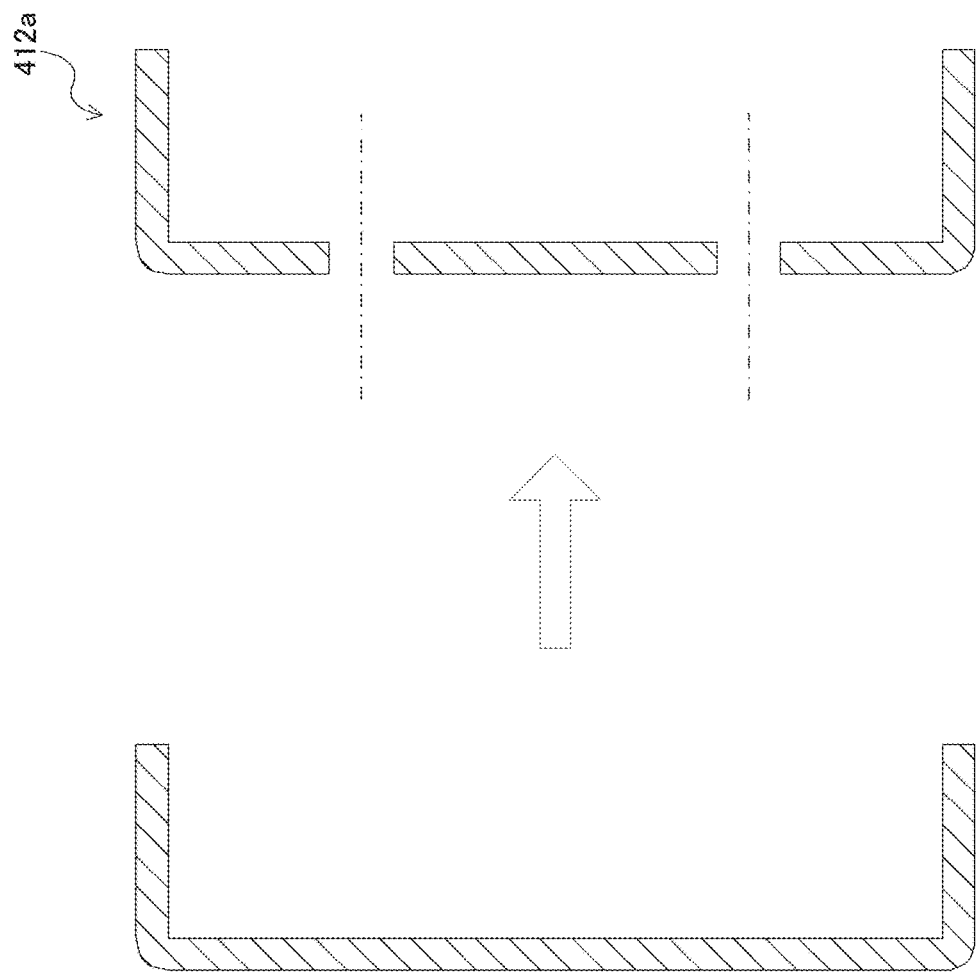
FIG. 21 shows the forming of holes in a component for using conventional pins.
Figure 22:
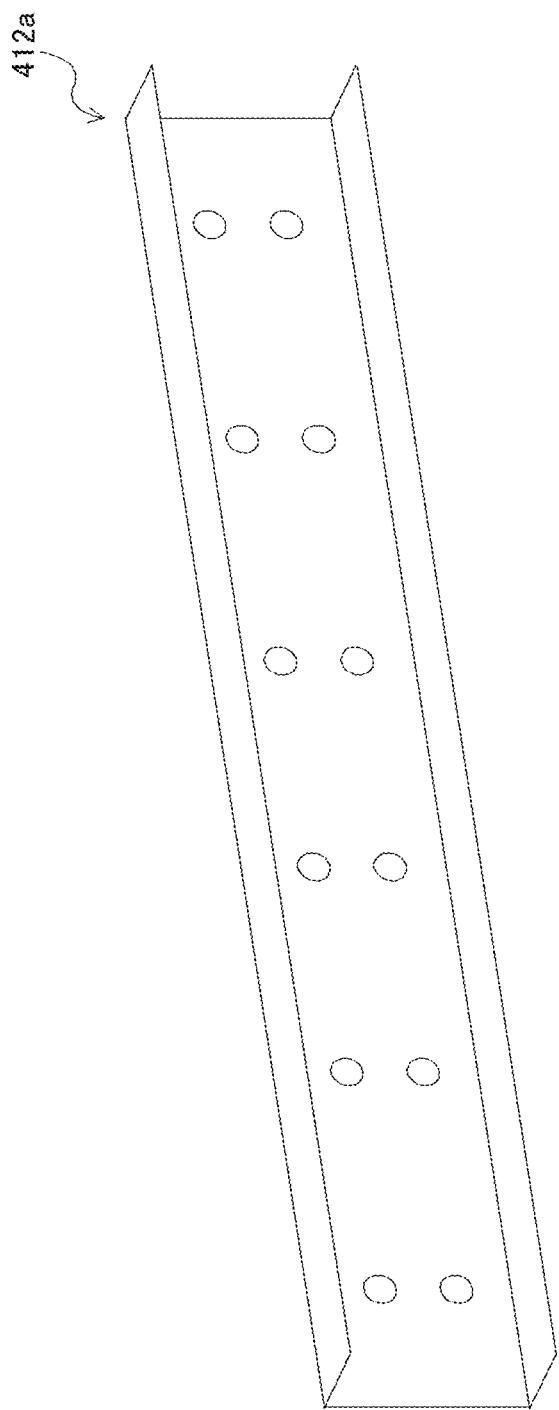
FIG. 22 shows the forming of holes in a component for using conventional pins.
Figure 23:
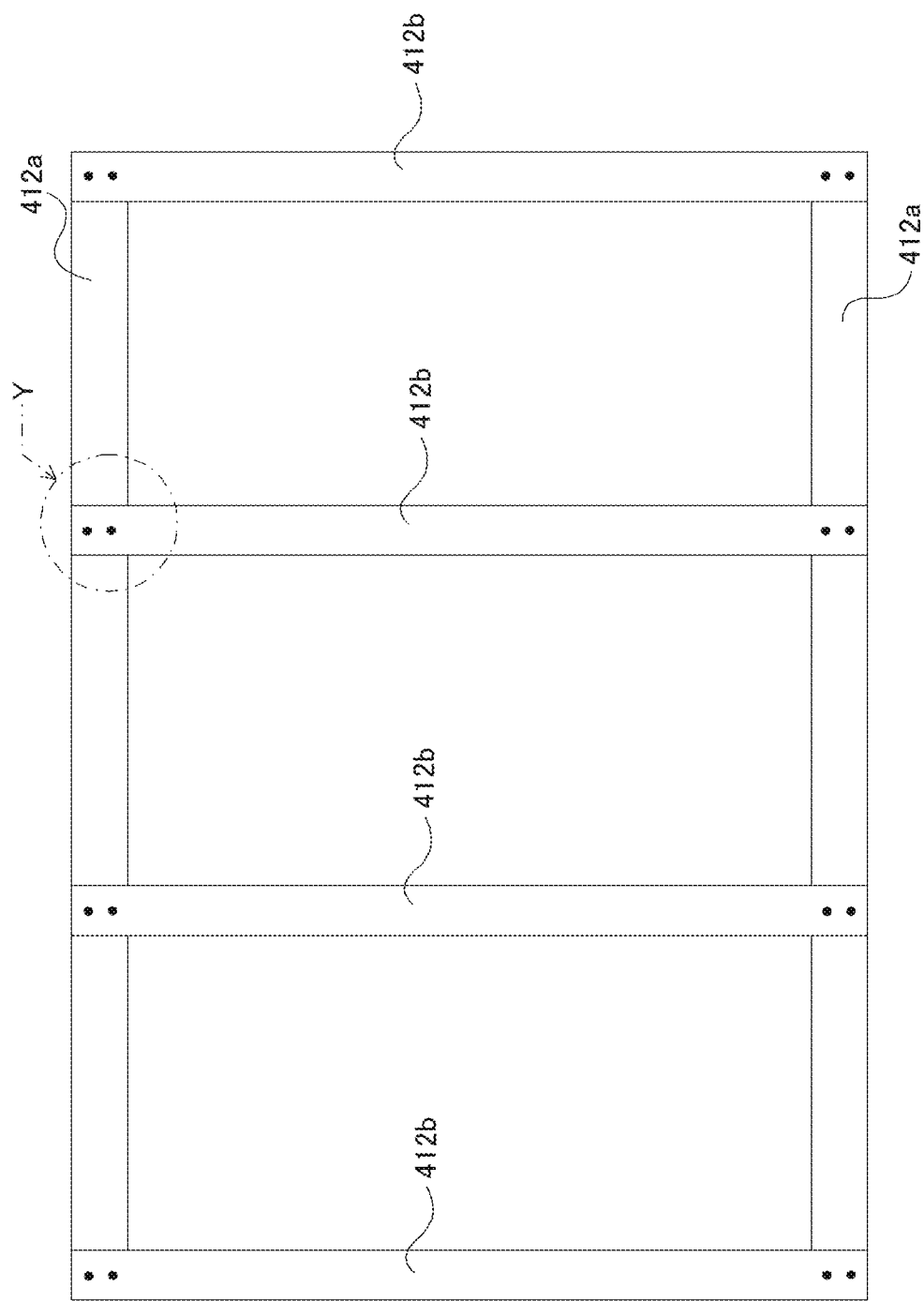
FIG. 23 shows a two-point fastening using conventional pins.
Figure 24:
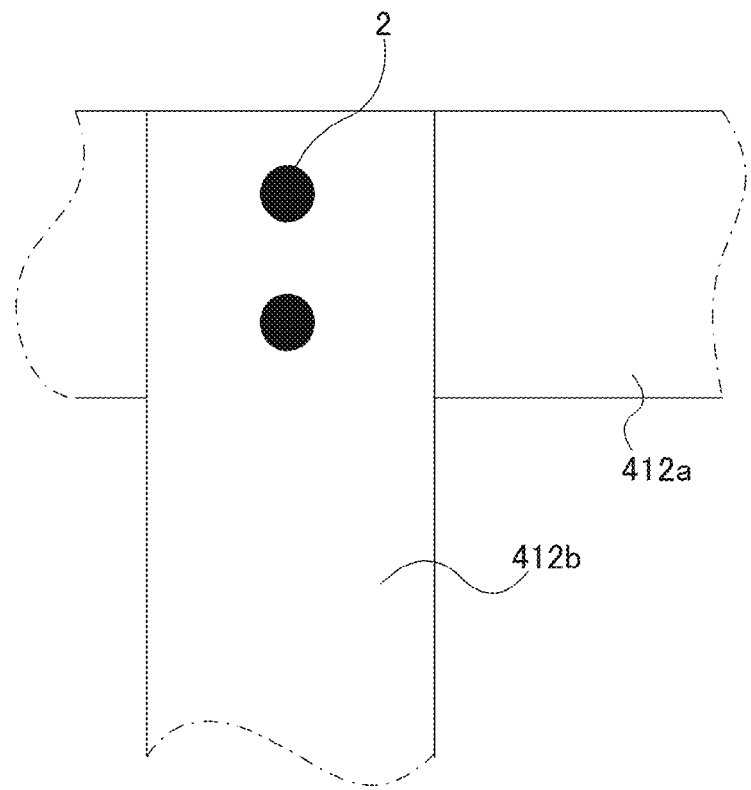
FIG. 24 is an enlarged view of part Y, which is shown surrounded by a dotted dashed line in FIG. 23.
Figure 25:
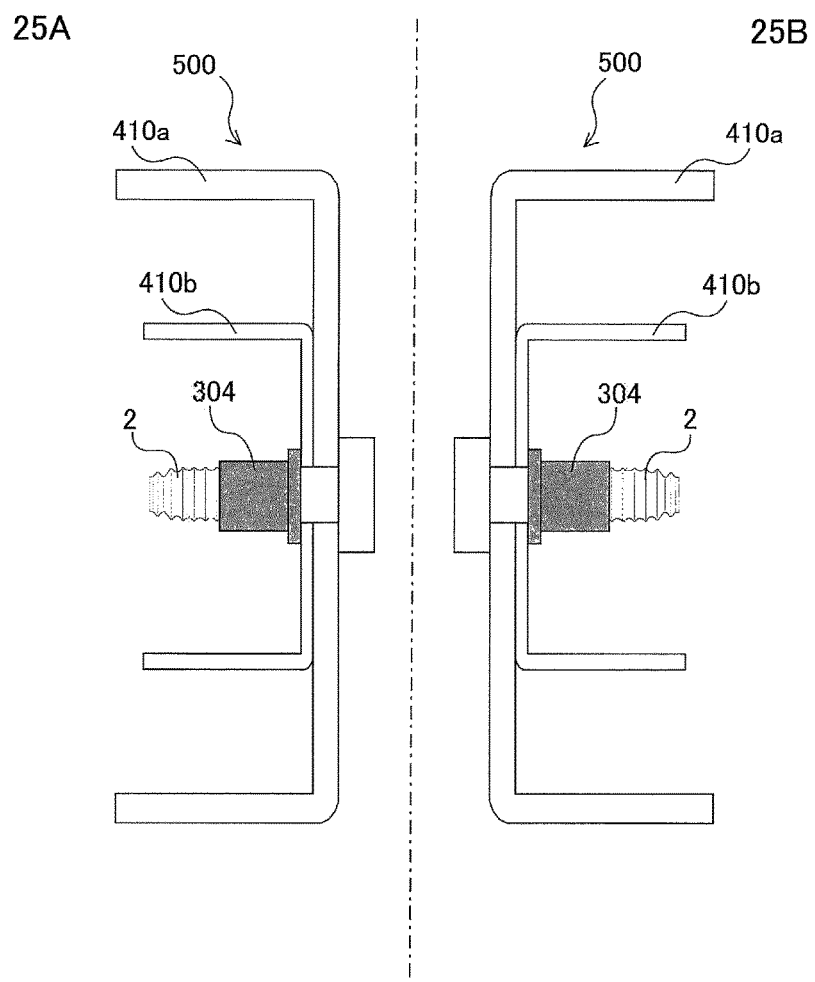
FIG. 25 shows a problem in fastening components using conventional pins.

Depending on the axial cross-section of the pin (10), the inner circumference of the collar (30) can be changed, as shown in FIGS. 16A to 16F. Just like the shaft (14) of the pin (10), the outer circumference of the collar (30) can be, for example, triangular (as shown in FIG. 16A), pentagonal (as shown in FIG. 16C), hexagonal (as shown in FIG. 16D), octagonal (as shown in FIG. 16E) and so forth if there is no problem with the swaging. As shown in 16F, both the inner and outer circumferences can be changed according to the axial cross-section of the pin (10).

The swaging method and device in the original embodiment are not the only possible choices. The requirement is to reduce the diameter of the collar (30). The swaging method and device can be changed depending on the form of the collar (30). For example, an angular collar can be made thin by first pressing two opposite faces and then pressing the remaining two faces. Here the diameter reduction of the collar is called swaging, but this expression covers other process names that have the same meaning.

In the original embodiment, the first and second components (4a, 4b) are planar components. However, this is not an absolute requirement. It is possible that the first component (4a) includes a planar part, and the second component includes a planar part or subcomponent. The minimum requirement is that one of the first and second components (4a, 4b) allows the bonding (welding) of the pin (10), and the other allows the forming of the insertion hole (6).

The fastening method according to the present invention, specifically the method for fastening the first and second components (4a, 4b) using the pin (10) and the collar (30), can adopt different orders of steps from the order of steps described above. For example, if the first and second components (4a, 4b) are to be gaplessly fastened, the swaging of the collar (30) must come last in the fastening. However, if the first and second components (4a, 4b) are to be fastened with some allowance for a gap, the swaging of the collar (30) can come before inserting the pin (10) into the insertion hole (6) in the second component (4b) and bonding (welding, etc.) the bonding part (12) of the pin (10) to the first component (4a).

INDUSTRIAL APPLICABILITY

The present invention can be applied to fastening members in various industries, including electric machines, automobiles, homes, railways and furniture (racks).

REFERENCE SIGNS LIST

1 Fastening member
2 Conventional pin
4a, 400a, 402a, 404a, 406a, 408a, 410a, 412a, 414a, 416a First component (to be fastened) 4b, 400b, 402b, 404b, 406b, 408b, 410b, 412b, 414b, 416b Second component (to be fastened)
5 Fixation position
6, 60, 602 Insertion hole
10 Pin
12, 112, 122, 124 Bonding part
14, 142, 144 Shaft
16, 164 Pillar part
18, 182, 184 Groove part
20, 202, 204 Non-welding end ridge part
30, 304 Collar
40 Installation tool
500 Fastened products
600, 600a, 600b, 614a, 614b, 616a, 616b Holes

What is claimed is:

1. A fastening structure, which comprises:
a first component that has a plate-like flange portion and a web connected to a back surface of the flange portion,
a pin that has a plurality of non-helical grooves running in a circumferential direction and aligned along a longitudinal direction, and one end of the pin in the longitudinal direction is erectly bonded to the flange portion of the first component,
a second component that has a planar part and an insertion hole formed through the planar part for the pin inserted therein, and the planar part of the second component is stacked on a top surface of the flange portion of the first component in a surface contact manner, and
a collar that is fitted around and bonded to the pin, and abutted against the second component, and a diameter of the collar being reduced so as to engage an inner wall of the collar with the grooves of the pin,
wherein said second component is prevented from rotating with respect to said pin, and both of a portion of the pin in the insertion hole and the insertion hole are formed in non-circular shape perpendicular to the longitudinal direction, so that the second component is tightly fastened to the first component by the fastening structure.

2. A fastening structure, comprising:
a pipe having a flat portion;
a pin having a plurality of non-spiral grooves formed on a circumferential direction along the longitudinal direction, and one end of the pin in the longitudinal direction being fixed to the flat portion of the pipe and erectly coupled to the pipe,
a predetermined member that has a planar part and an insertion hole formed through the planar part, the pin being inserted into the insertion hole, the planar part of the predetermined member being stacked on the flat portion of the pipe, and the planar part being abutted against with the flat part of the pipe in a surface contact manner,
a collar that is fitted around and bonded to the pin, and abutted against the predetermined member, and a diameter of the collar is reduced so as to engage an inner wall of the collar with the grooves of the pin,
wherein the predetermined member is prevented from rotating with respect to the pipe, both of a portion of the pin inserted into the insertion hole and the insertion hole are formed in a non-circular shape so that the predetermined member is tightly fastened to the pipe by the fastening structure.

3. A fastening structure having two fastened products placed back to back, and each fastened product comprising:
a first component having a front side and a back side formed with a flat portion, respectively;
a pin having a plurality of non-spiral grooves formed on a circumferential direction along the longitudinal direction, and one end of the pin in the longitudinal direction being fixed to the flat portion of the first component and erectly coupled to the first component, a second component that has a planar part and an insertion hole formed through the planar part, the pin being inserted into the insertion hole, the planar part of the second component being stacked on the flat portion of the front side of the first component in a surface contact manner;

a collar that is fitted around and bonded to the pin, and abutted against the planar part of the second component, and a diameter of the collar being reduced so as to engage an inner wall of the collar with the grooves of the pin;

wherein the second component is prevented from rotating with respect to the first component, both of a portion of the pin inserted into the insertion hole and the insertion hole are formed in a non-circular shape so that the second component is tightly fastened to the first component by the fastening structure.

\* \* \* \* \*